United States Patent
Lam et al.

(10) Patent No.: US 10,219,106 B1
(45) Date of Patent: Feb. 26, 2019

(54) SECURE BLE BROADCAST SYSTEM FOR LOCATION BASED SERVICE

(71) Applicant: Hong Kong Applied Science and Technology Research Institute Co., Ltd., Shatin, New Territories (HK)

(72) Inventors: Andy Lam, Kowloon (HK); Fred Wong, Kwai Chung (HK); Aldar Chan, Tiu Keng Leng (HK)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 0 days.

(21) Appl. No.: 15/881,295

(22) Filed: Jan. 26, 2018

(51) Int. Cl.
*H04W 4/02* (2018.01)
*H04W 4/80* (2018.01)

(52) U.S. Cl.
CPC .............. *H04W 4/02* (2013.01); *H04W 4/80* (2018.02)

(58) Field of Classification Search
CPC ....... H04W 4/21; H04W 12/06; H04W 24/10; H04W 88/06; H04W 4/027; H04W 52/0219
See application file for complete search history.

(56) References Cited

U.S. PATENT DOCUMENTS

| 8,571,519 | B2 | 10/2013 | Ginzboorg | |
| 9,456,416 | B2 * | 9/2016 | Vigier | H04W 52/0229 |
| 9,491,586 | B2 * | 11/2016 | Kostka | H04W 4/21 |
| 9,794,744 | B1 | 10/2017 | Gu et al. | |
| 2005/0043043 | A1 | 2/2005 | Winn | |
| 2010/0142365 | A1 * | 6/2010 | Richardson | H04L 1/0045 370/210 |
| 2014/0378057 | A1 | 12/2014 | Ramon et al. | |
| 2015/0005011 | A1 | 1/2015 | Nehrenz et al. | |
| 2015/0031392 | A1 * | 1/2015 | Un | G01S 5/02 455/456.1 |
| 2015/0081474 | A1 * | 3/2015 | Kostka | H04W 4/21 705/26.8 |
| 2015/0289133 | A1 * | 10/2015 | Qin | H04W 12/02 380/270 |
| 2015/0312762 | A1 | 10/2015 | Hernandez et al. | |

(Continued)

FOREIGN PATENT DOCUMENTS

| CN | 104393987 A | 3/2015 |
| CN | 105450627 A | 3/2016 |

(Continued)

OTHER PUBLICATIONS

International Search Report issued for PCT Application No. PCT/CN2018/075016, dated Sep. 27, 2018; 9 pages.

*Primary Examiner* — Diane D Mizrahi
(74) *Attorney, Agent, or Firm* — Norton Rose Fulbright US LLP

(57) ABSTRACT

The present disclosure relates to methods and systems for generation of a beacon identifier (ID) for increased security of a system for a location based service. The system includes a beacon device, such as a BLE device, a mobile device, and a server. The beacon device is configured to generate a beacon ID based on a beacon device identifier, such as a unique device identifier, of a beacon device and a time value. In some implementations, generation of the beacon ID includes a pseudorandom function and a shared key that is established between the beacon device and the server.

20 Claims, 11 Drawing Sheets

(56) References Cited

U.S. PATENT DOCUMENTS

| | | |
|---|---|---|
| 2016/0047887 A1 | 2/2016 | Niewczas et al. |
| 2017/0017994 A1* | 1/2017 | Walden |
| 2017/0163483 A1* | 6/2017 | Shanmugam ....... H04L 41/0806 |
| 2017/0180930 A1* | 6/2017 | Mycek ................ H04B 17/318 |
| 2017/0269186 A1* | 9/2017 | Sharma ..................... G01S 1/70 |
| 2018/0091954 A1* | 3/2018 | Maricic ................ H04W 4/043 |

FOREIGN PATENT DOCUMENTS

| | | |
|---|---|---|
| CN | 106060760 A | 10/2016 |
| CN | 106407794 A | 2/2017 |

\* cited by examiner

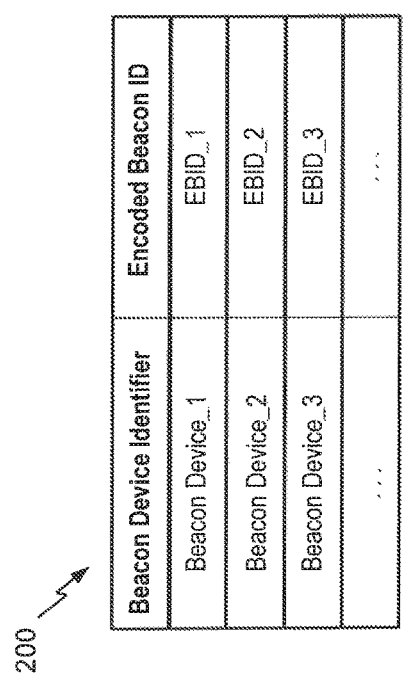
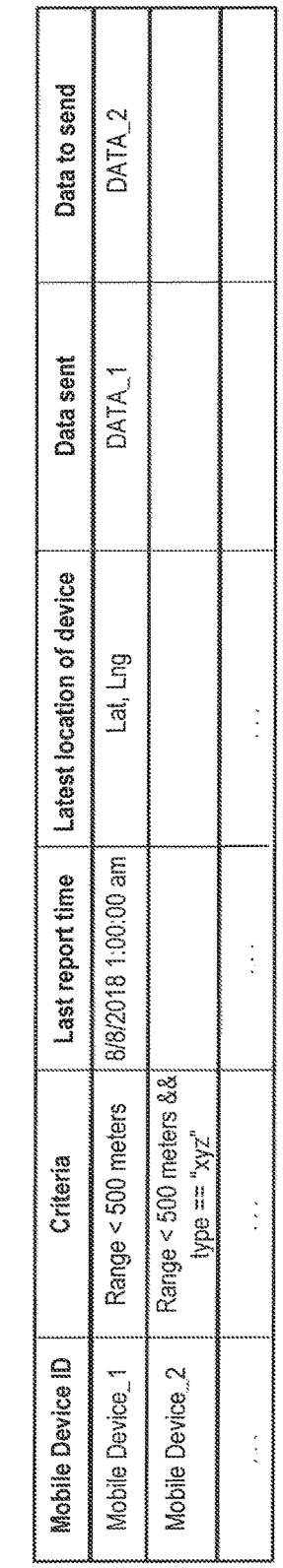

230

| Beacon IDs | Time | Time in sec since 1970 | Truncated value (n=8) | Time Difference to last time |
|---|---|---|---|---|
| EBID_1-0 | 1/1/2017 09:59:28 (am) | 1011000011010001101001101100000000 | 10110000110100011010011 | - |
| EBID_1-1 | 1/1/2017 10:03:44 (am) | 1011000011010001101010000000000000 | 10110000110100011010100 | 256 seconds |
| EBID_1-2 | 1/1/2017 10:08:00 (am) | 1011000011010001101010100000000000 | 10110000110100011010101 | 256 seconds |

*FIG. 2D*

240 — Mapping Data_1 at T−δ

| Encoded Beacon ID | Beacon Device Identifier |
|---|---|
| EBID_1-0 | Beacon Device_1 |
| EBID_2 | Beacon Device_2 |

250 — Mapping Data_1 at T

| Encoded Beacon ID | Beacon Device Identifier |
|---|---|
| EBID_1-1 | Beacon Device_1 |
| EBID_2 | Beacon Device_2 |

260 — Mapping Data_1 at T+δ

| Encoded Beacon ID | Beacon Device Identifier |
|---|---|
| EBID_1-2 | Beacon Device_1 |
| EBID_2 | Beacon Device_2 |

| Encoded Beacon ID | Beacon Device Data |
|---|---|
| Beacon Device_1 | Beacon Data_1 |
| Beacon Device_2 | Beacon Data_2 |

*FIG. 2F*

SECURE BLE BROADCAST SYSTEM FOR LOCATION BASED SERVICE

TECHNICAL FIELD

The present disclosure is generally related to a location based service, and, but not by way of limitation, to methods and systems for communication technology for Bluetooth Low Energy (BLE) devices, and more particularly to improvements for beacon identifier generation and coordination between devices of a system that includes BLE devices, one or mobile devices, and a backend server.

BACKGROUND OF THE INVENTION

Mobile devices have become personal and trusted devices resulting from an increase in mobile telephone networks and through advances in technology and the addition of functionalities. Additionally, a number of systems have been established which provide personalized and localized services for mobile devices. Bluetooth Low Energy (BLE), introduced as part of the Bluetooth 4.0 specification, is a low energy variant of the Bluetooth short range wireless standard. The purpose of BLE is to provide an extremely low power wireless system. For example, BLE device may be powered by a coin-size battery. The low cost, robustness, and data throughput provided by BLE devices has made BLE an attractive option for many applications in industrial, environmental, automotive, and medical environments, such that BLE devices have been incorporated into systems to provide personalized and localized service. To illustrate, BLE devices can be used to provide location based services for mobile devices.

In a location based service, a beacon device (e.g., a BLE device) provides a short range beacon that provides location-specific information to a mobile device. The beacon device is programmed to broadcast a beacon ID (included in a beacon message or a beacon packet) to mobile devices in a vicinity of the beacon device. A mobile device detects such a beacon ID and an application (e.g., dedicated mobile location based service application) can look up, based on the beacon ID, where to download the content corresponding to the received beacon message. The beacon message may include data components, such as: (1) a universally unique identifier (UUID), (2) Major, (3) Minor, and TX Power, as illustrative, non-limiting examples. The value of the UUID usually corresponds to a particular App or company, and the combination of Major and Minor permit divisions of beacons (e.g., beacon types) belonging to the company or the same UUID. TX Power may specify the power at 1 meter from the beacon so that an mobile device configured to read a received signal strength indicator (RSSI) would be possible to estimate the mobile device's distance from the beacon device.

The beacon device (e.g., the BLE device) typically uses short range wireless communication, such as Bluetooth, which enables a mobile device to quickly obtain information transmitted via the beacon. Because of the short range nature of the beacon message communicated from the beacon device, the beacon message does not have the capability to connect directly to a central network (or server) by way of the global communications system. Accordingly, the mobile device retrieves a code (or address) from the beacon message and then uses the mobile device's global communications system to download related information from a central network, such as a server (e.g., a cloud server).

The fact that beacon devices often transmit beacons (e.g., beacon messages) that can be detected by nearly every capable mobile device raises concerns regarding the security of beacons. For example, security threats related to beacons and use of beacons for location based services include spoofing attacks, piggybacking attacks, and re-programming attacks.

Spoofing Attacks

Beacon devices unselectively broadcast beacon IDs, which means that anyone with a receiver (e.g., a Bluetooth 4.0 receiver) would be able to listen the beacon messages. As a result, it is possible for an attacker to forge fake beacons with the same ID (possibly placed in different locations geographically) by "spoofing" the original beacon ID. A mobile device cannot tell apart a real beacon and a fake beacon since the beacon IDs of the real beacon and the fake beacon are the same. While the real beacon is useful in providing a location based service, the fake beacon however could be problematic. For example, when beacons are used for an indoor location application or other location based service, the fake beacon can cause confusion and inaccurate location positions.

Piggybacking Attacks

A piggybacking or hijacking attack refers to a situation where an unauthorized party attempts to operate its own service at least in part by leveraging, without consent or authorization, the beacon infrastructure maintained and controlled by others. Beacon devices unselectively broadcast beacon IDs, the unauthorized party can listen to and record all beacon IDs of interest and record locations corresponding to the beacon IDs, and build an application and provide services using the recorded beacon IDs. In some situations, the unauthorized party may be a business competitor of the legitimate owner/operator of the beacon infrastructure, so that the unauthorized part can offer a competing coupon with a more attractive deal for customers whenever the customers receive a coupon from the authorized owner as triggered by the proximity to particular beacon devices.

Re-Programming Attacks

Some beacon devices allow over-the-air programming or software update. Without proper authentication implemented at a beacon devices, an attacker can potentially gain access to the beacon device and re-program the beacon device, such as re-programming the beacon device with a new beacon ID. Re-programming the beacon device with a new beacon ID may render the original service associated with the beacon device unavailable—a kind of denial of service attack.

While location based services are attractive and beneficial to owners of mobile devices, as well as business owners, security threats (e.g., spoofing attacks, piggybacking attacks, and re-programming attacks) exist when location based services are provided. Such threats reduce an effectiveness of location bases services (e.g., increase overhead and network traffic), decrease network and device efficiency (e.g., waste device power), and have the effect of prohibiting and discouraging widespread adoption of location based services.

BRIEF SUMMARY OF THE INVENTION

The present disclosure is generally related to systems and methods that provide a secure location based service. A system includes a beacon device (e.g., a BLE device), a mobile device, and a server, such as a cloud server. In the system, the beacon device is configured to update its beacon based on beacon data (e.g., a UUID, Major value, a Minor value, a TX Power value, location data, and/or a combination thereof) of the beacon device and a time value. To illustrate, the beacon device may use a pseudorandom function, along with a key (e.g., a secret shared key) established between the beacon device and the server, to generate an encoded beacon ID (e.g., an updated beacon ID) based on the beacon data and the time value. In some implementations, the time value may be a truncated value of a current time identified at the beacon device. Accordingly, the beacon device updates its beacon value that is broadcast to one or more mobile devices. Because the beacon device updates (e.g., periodically or regularly) its beacon device ID, the beacon ID (e.g., the encoded beacon ID) of the beacon device may be considered to "evolve" over time. Over a time period in which the beacon device changes its beacon ID, the values of the broadcast encoded beacon ID appears random to a potential attacker, but remain recognizable to legitimate users (as described below). By changing the beacon ID (and appearing to provide a random beacon ID), the system is able to defend against piggybacking attacks which rely on identification and continued use of a beacon ID to enable the attackers unauthorized use of the system.

In an aspect of the present disclosure, the server maintains data associated with the beacon device and the beacon ID to enable coordination between the different devices of the system. For example, the data may include beacon data, such as coordinates of the beacon device, a device type of the beacon device, a name of the beacon device, a service provided by the beacon device, etc. As another example, the server maintains a shared key (e.g., a secret key) established between the beacon device and the server. In some implementations, the server is configured to generate encoded beacon IDs (e.g., beacon IDs to be used in the future) as described above with reference to the beacon device. In such implementations, the server maintain a mapping data structure to map the encoded beacon ID(s) to the beacon data (e.g., the UUID, etc.) of the beacon device.

In some aspects of the present disclosure, the server receives an encoded beacon ID from a mobile device, maps the encoded beacon ID to the beacon data, and provides the beacon data to the mobile device. When the mobile device provides an encoded beacon ID to the server, the server is unable to know what beacon device identifier was used to generate the encoded beacon ID. This uncertainty maintains user privacy protection by ensuring that the server cannot learn what beacon ID the user has used to make a query. In other aspects, the server determines a location associated with the mobile device and provides a mapping data structure and corresponding beacon data to the mobile device based on the location data, at least one criterion, or both. For example, the mobile device may provide location data to the server and the server may generate a mapping data structure based on one or more beacon devices proximate to the mobile device. In this manner, the mobile device may look up a particular encoded beacon ID without having to provide the encoded beacon ID to the server. Additionally, or alternatively, the server may generate filter parameters based on encoded beacon IDs determined by the server and may provide the filter parameters to the mobile device. The mobile device may apply the filter parameters to received encoded beacon IDs (e.g., to all received beacon IDs) in order to decrease the unnecessary request to the backend server, thus reducing overhead messaging between the server and the mobile device.

In another aspect of the present disclosure, the beacon device implements a pseudorandom function, or other encryption technique, to generate the beacon ID, a message or packet that includes the beacon ID, or both. The pseudorandom function, or the other encryption technique, creates a Message Authentication Code (MAC) tag. In some implementations, the MAC tag is generated based on location information, a time value, or a combination thereof, as illustrative, non-limiting examples. The MAC can be part of the beacon ID or stand as a separate field. By including the MAC in the beacon ID (or in a message or packet that includes the beacon ID), the beacon device is able to defend against spoofing attacks by enabling other devices (e.g., the mobile device or the server) to validate the beacon ID based on the MAC.

In another aspect of the present disclosure, the beacon device uses entity authentication to establish communication with a device. If another device is not properly authenticated, the beacon device disregards communications received from the other device. For example, the beacon device may establish a secure channel with the server using an authentication protocol, such as a RSA protocol. Because the beacon device may be a low power device, operations, such as exponential calculations or inverse calculations, typically associated with implementation of the authentication protocol can be burdensome for the beacon device. Accordingly, the present disclosure describes performing (e.g., delegating) at least a portion of one or more operations associated with the authentication protocol to another device, such the mobile device. In this manner, the beacon device is relieved of some of the burden (e.g., computational complexity and power use) associated with the authentication protocol. In some implementations, after secure communication has been established between the beacon device and the server, the beacon device may update a shared key for used between the server and the beacon device. Additionally, or alternatively, the beacon device and the mobile device may authenticate the mobile device and may establish another secure communication between the mobile device and the beacon device with the assistance of the server. By being able to authenticate and establish secure communication channels, the beacon device is able to protect against re-programming attack by entities that do not have authorization to initiate re-programming of the beacon device.

Thus, the present disclose includes a number of security mechanisms and protocols to defend against security threats in the context of location based services. The security mechanisms and protocols provide a technical framework to mitigate and prevent spoofing attacks, piggybacking attacks, and re-programming attacks. Successful mitigation of such attacks improves operation and reliance of a location based services system, deters potential attacks which reduces overhead communication between devices, and improves efficiency and power usage of individual devices included in the system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIGS. 2A-2F depict examples of data structures usable by the system of FIG. 1;

DETAILED DESCRIPTION OF THE INVENTION

Particular implementations of the present disclosure are described below with reference to the drawings. In the description, common features are designated by common reference numbers throughout the drawings. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term).

As used herein, various terminology is for the purpose of describing particular implementations only and is not intended to be limiting of implementations. For example, the singular forms "a," "an," and "the" are intended to include the plural forms as well, unless the context clearly indicates otherwise. It may be further understood that the terms "comprises" and "comprising" may be used interchangeably with "includes" or "including." Additionally, it will be understood that the term "wherein" may be used interchangeably with "where."

Figure 1:
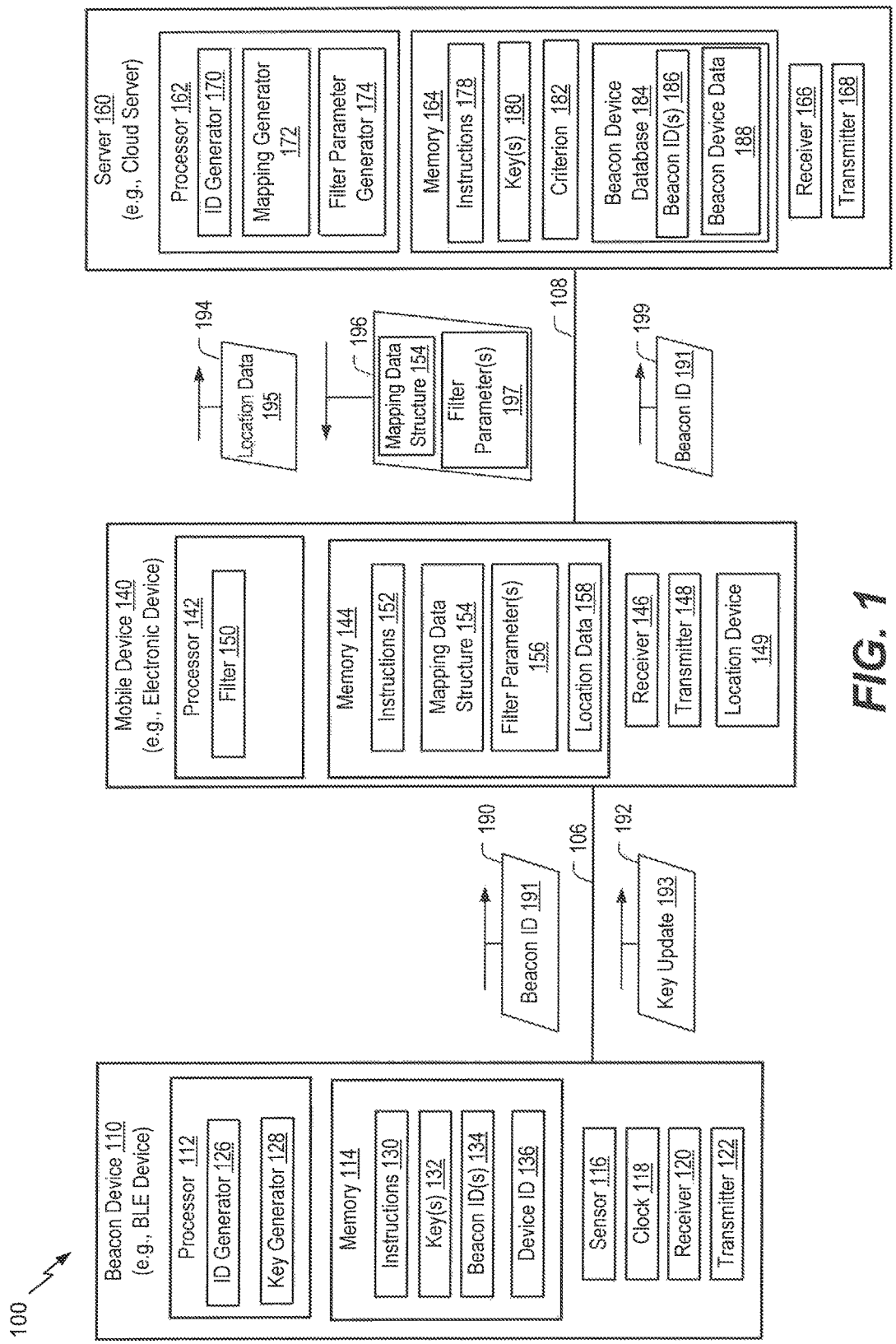
FIG. 1 illustrates an exemplary system in which the exemplary embodiments of the instant invention may be practiced.

Referring to FIG. 1, a block diagram of an example of a system 100 for location based services is depicted. The system 100 includes a beacon device 110, a mobile device 140, and a server 160. The beacon device 110 may include or correspond to a BLE device. In some implementations, the server 160 may include or correspond to a cloud server. The beacon device 110 is communicatively coupled to the mobile device 140 via a wireless connection 106. The mobile device is communicatively coupled to the server 160 via one or more connections 108, such as a wired connection, a wireless connection, or a combination thereof. Although the system 100 is shown as having one beacon device 110 and one mobile device 140, in other implementations, the system 100 may include multiple beacon devices (e.g., 110), multiple mobile devices (e.g., 140), or a combination thereof.

The beacon device 110 is configured to generate and transmit beacon messages. The beacon device 110 includes a processor 112, a memory 114, a sensor 116, a clock 118, a receiver 120, and a transmitter 122. The processor 112 includes an ID generator 126 and a key generator 128. The ID generator 126 is configured to generate beacon identifiers (IDs), such as encoded beacon IDs, as described herein with reference to FIGS. 3A and 13. The key generator 128 is configured to generate one or more keys, such as a delegation key as described with reference to FIG. 5, a shared key (e.g., a secret key) as described herein with reference to FIG. 6, or both.

Memory 114 may include ROM devices, RAM devices, one or more HDDs, flash memory devices, SSDs, other devices configured to store data in a persistent or non-persistent state, or a combination of different memory devices. The memory 114 includes instructions 130, one or more keys 132, one or more beacon IDs 134, and a beacon device identifier 136 (e.g., a UUID). In aspects, memory 114 may store the instructions 130 that, when executed by processor 112, cause the processor 112 to perform operations according to aspects of the present disclosure, as described herein. The one or more keys 132 may include a delegation key, a master key, a shared key (e.g., a secret key), a public key, or a combination thereof, as illustrative, non-limiting examples. The one or more beacon IDs 134 may be generated by the ID generator 126 as described herein.

The sensor 116 may be used to sense, observe, generate, and/or collect data, and the data may be reported to server 160. In aspects, the data generated by the sensor 116 may include status data, environmental data, pressure data, temperature data, humidity data, health-related data, fitness related data, proximity data, power data, etc. Those of ordinary skill in the art will appreciate that there are numerous other types of data may be sensed and/or generated by the sensor 116 and that the exemplary types of data described herein are provided for purposes of illustration, rather than by way of limitation. The clock 118 may include a module or circuit (not shown) for providing real-time clock capabilities. The receiver 120 is configured to receive data (e.g., beacons, messages, packets, etc.) from one or more devices, and the transmitter 122 is configured to transmit data (e.g., beacons, messages, packets, etc.) to one or more devices. In some implementations, the receiver 120 and the transmitter 122 are included in a transceiver. The receiver 120, the transmitter 122, or both, may be configured to enable communication according to one or more communication protocols or standards (e.g., a Bluetooth protocol, an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) protocol, and a 4th Generation (4G)/long term evolution (LTE) protocol, etc.), as illustrative, non-limiting examples.

The mobile device 140 may include a smartphone, a tablet computing device, a personal computing device, a laptop computing device, a desktop computing device, a computer system of a vehicle, a personal digital assistant (PDA), a smart watch, a global positioning system (GPS) device, etc. The mobile device 140 includes a processor 142, a memory 144, a receiver 146, a transmitter 148, and a location device 149. The processor 142 may include a filter 150, such as a Bloom filter. The filter 150 may be configured to operate in accordance with one or more filter parameters 156 to filter received beacon IDs (received from a beacon device, such as the beacon device 110), as described with reference to FIG. 4.

Memory 144 may include ROM devices, RAM devices, one or more HDDs, flash memory devices, SSDs, other devices configured to store data in a persistent or non-persistent state, or a combination of different memory devices. The memory 144 includes instructions 152, a mapping data structure 154 (e.g., a hash table), the filter parameters 156, and location data 158. In aspects, memory 144 may store the instructions 152 that, when executed by processor 142, cause the processor 142 to perform operations according to aspects of the present disclosure, as described herein. The mapping data structure 154 may map a beacon ID (e.g., an encoded beacon ID) to a beacon device identifier, as described further herein with reference to FIGS. 2A, 2F, 3C, and 11. The one or more filter parameters 156 may be generated by and received from the server 160 as described further herein. For example, the mobile device 140 may receive filter parameters 197 and store the filter parameters 197 as the filter parameters 156.

The receiver 146 is configured to receive data (e.g., beacons, messages, packets, etc.) from one or more devices, and the transmitter 148 is configured to transmit data (e.g., beacons, messages, packets, etc.) to one or more devices. In some implementations, the receiver 146 and the transmitter 148 are included in a transceiver. The receiver 146, the transmitter 148, or both, may be configured to enable communication according to one or more communication protocols or standards (e.g., a Bluetooth protocol, an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) protocol, and a 4th Generation (4G)/long term evolution (LTE) protocol, etc.), as illustrative, non-limiting examples. The location device 149, such as a GPS de, is configured to generate the location data 158.

The server 160 may include a processor 162, a memory 164, a receiver 166, and a transmitter 168. The processor 162 includes an ID generator 170, a mapping generator 172, and a filter parameter generator 174. The ID generator 170 is configured to generate beacon identifiers (IDs), such as encoded beacon IDs, as described herein. The mapping generator 172 is configured to mapping data structures, such as the mapping data structure 154. The filter parameter generator 174 is configured to generate the filter parameters 197. For example, the filter parameter generator 174 may generate the filter parameters 197 based on the beacon device database 184.

Memory 164 may include ROM devices, RAM devices, one or more HDDs, flash memory devices, SSDs, other devices configured to store data in a persistent or non-persistent state, or a combination of different memory devices. The memory 164 includes instructions 178, one or more keys 180, a criterion 182, and a beacon device database 184. In aspects, memory 164 may store the instructions 178 that, when executed by processor 162, cause the processor 162 to perform operations according to aspects of the present disclosure, as described herein. The one or more keys 180 may include a delegation key, a master key, a shared key (e.g., a secret key), a public key, or a combination thereof, as illustrative, non-limiting examples. The criterion 182 (e.g., at least one criteria) includes a parameter used by the mapping generator to generator one or more mapping data structures (e.g., 154). For example, the mapping generator 172 may apply the criterion 182 to select, for inclusion in a particular mapping data structure 154, one or more beacon devices identified in the beacon device database 184. The beacon device database 184 includes beacon IDs 186 (e.g., encoded beacon IDs), and beacon device data 188. For a particular beacon device, the beacon device data 188 may include a coordinate of a particular beacon device, a device type, a name, a service, etc.

The receiver 166 is configured to receive data (e.g., beacons, messages, packets, etc.) from one or more devices, and the transmitter 168 is configured to transmit data (e.g., beacons, messages, packets, etc.) to one or more devices. In some implementations, the receiver 166 and the transmitter 168 are included in a transceiver. The receiver 166, the transmitter 168, or both, may be configured to enable communication according to one or more communication protocols or standards (e.g., a Bluetooth protocol, an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) protocol, and a 4th Generation (4G)/long term evolution (LTE) protocol, etc.), as illustrative, non-limiting examples.

In aspects, the server 160 may provide database functionality for various aspects of system 100. For example, the server 160 may store configuration information associated with a configuration of beacon devices (e.g., 110) deployed in system 100, as described in more detail below. Additionally, the server 160 may maintain, within its memory, one or more databases configured to store data generated by beacon devices operating within system 100.

In an aspect, the server 160 may be a single device configured to perform the operations described herein. Those of skill in the art would recognize that although FIG. 1 illustrates the server 160 as a single block, the implementation of server 160 is not limited to a single component, and instead may be distributed over several components. For example, operations of the server 160 may be distributed over multiple devices configured to perform all or a portion of the operations of the server 160 in accordance with the present disclosure. Implementing the server 160 functionality over multiple devices may increase the reliability/uptime of system 100, e.g., if one of the multiple devices fails, the server 160 operations may continue running on other ones of the multiple devices.

During operation, the beacon device 110 and the server 160 may establish a shared key (e.g., a secret key). Additionally, the beacon device 110 may provide beacon device data (e.g., coordinates, the device ID 136, etc.) to the server 160 that the server 160 stores at the beacon device database 184.

The server 160 (e.g., the ID generator 170) may generate one or more encoded beacon IDs that may be used by the beacon device 110. Additionally, the server 160 (e.g., the mapping generator 172) may generate one or more mapping data structures (e.g., 154) that map the one or more beacon IDs to the device ID 136. In some implementations, the mapping data structure 154 may also include beacon device data for each beacon device included in the mapping data structure 154. Additionally, or alternatively, the server 160 (e.g., the filter parameter generator 174) may generate the filter parameters 197 that may be applied by a filter to identify encoded beacon IDs that correspond to beacon devices included in (indicated by) the beacon device database 184).

The mobile device 140 may report its location (indicated by location data 195) to the server 160. For example, the mobile device 140 may send a message 194 (or a packet) to the server 160 that includes the location data 195. In response to receiving the location data 195, the server 160 may generate the mapping data structure 154 based on the beacon device database 184 and the criterion 182. The server 160 may send the mapping data structure 154, and optionally the filter parameters 197, to the mobile device 140. For example, the server 160 may send a message 196 (or a packet) to the mobile device 140 that includes the mapping data structure 154 and the filter parameters 197.

The beacon device 110 may determine whether it is time to broadcast a beacon messages (e.g., an coded beacon ID), whether it is time to generate a new encoded beacon ID, or both. When it time to generate a new encoded beacon ID, the beacon device 110 may operate as described with reference to FIGS. 3A and 11. For example, the beacon message may be generated based on the device ID 136 and a time value based on the clock 118. In some implementations, the encoded beacon ID is generated using a pseudorandom function, the shared key, the device ID 136, and the time value. In response to a determination to broadcast a beacon message, the beacon device 110 generates a message 190 that includes the encoded beacon ID 191 and transmits (e.g., broadcasts) the message 190.

In some implementations, the beacon device 110 implements a pseudorandom function, or other encryption technique, to generate the encoded beacon ID 191, the message 190 (or packet) that includes the encoded beacon ID 191, or both. The pseudorandom function, or the other encryption technique, creates a Message Authentication Code (MAC) tag. In some implementations, the MAC tag is generated based on location information, a time value, or a combination thereof, as illustrative, non-limiting examples.

The mobile device 140 scans for messages that include beacon IDs (e.g., encoded beacon IDs). In response to receiving the message 190, the mobile device 140 identifies the encoded beacon ID 191 and performs a lookup operation to determine whether the encoded beacon ID 191 is included in the mapping data structure 154. In response to a determination that the encoded beacon ID 191 is included in the mapping data structure 154, the mobile device 140 identifies (based on the encoded beacon ID 191 and/or the mapping data structure 154) a beacon device ID (e.g., 136) of the beacon device 110, beacon device data corresponding to the beacon device 110, or both. Alternatively, in response to a determination that the encoded beacon ID 191 is not included in the mapping data structure 154, the mobile device 140 sends a look up request to the server 160 in the form of a message 199 that includes the encoded beacon ID 191. The server 160 receives the message 199 and performs a look-up operation to determine whether the server 160 can identify a beacon device that correspond to the encoded beacon ID 191. For example, the server 160 may perform a look-up operation, and one or more subsequent operations, as described with reference to FIG. 3C.

In some implementation, when the mobile device 140 includes the filter parameters 197, the mobile device 140 may apply the filter to the received encoded beacon ID 191 prior to determine whether the encoded beacon ID 191 is included in the mapping data structure 154. For example, the mobile device 140 may perform the filtering operation as described with reference to FIG. 4. If the mobile device 140 determines that the encoded beacon ID 191 does not pass the filter test, the encoded beacon ID 191 may be discarded. Alternatively, if the mobile device 140 determines that the encoded beacon ID 191 passes the filter test, the mobile device 140 may perform the look-up operation using the mapping data structure 154, may send the message 199 to the server 160, or both.

In some implementations, the beacon device 110 may generate a key update 193 and may include the key update 193 (e.g., the updated shared key) in a message 192 that is sent to the server 160. An example of generate of an updated shared key (e.g., 193) is described with reference to FIG. 6.

In some implementations, the system 100 may enable a key delegation protocol in which the beacon device 110 can establish secure communication with another device, such as the mobile device 140. An example of a delegation protocol is described with reference to FIG. 5. Additionally, or alternatively, in some implementations, the system 100 enables secure communication between devices of the system. For example, as described herein, cryptography (using RSA) is described with reference to FIG. 7, RSA signature verification is described with reference to FIG. 8, modular inverse ($C_{inv}$, $S_{inv}$) for use in RSA decryption is described with reference to FIG. 9, and RSA decryption is described with reference to FIG. 10.

In a particular aspect of the system 100 of FIG. 1, an apparatus (e.g., the beacon device 110) includes the memory 114 configured to store a beacon device identifier (e.g., 136) and the processor 112 coupled to the memory 114 and configured to determine a time value and to generate an encoded beacon identifier (ID) 191 based on the beacon device identifier (e.g., 136) and the time value. The apparatus (e.g., the beacon device 110) further includes the transmitter 122 coupled to the processor 112 and configured to transmit the encoded beacon ID 191 to the mobile device 140. In some implementations, the apparatus (e.g., the beacon device 110) also include the clock 118 configured to generate time data. The memory 114 is further configure to store a session key established with the server 160. In a particular implementation, the processor 112 is further configured to identify particular time data from the clock 118, truncate the particular time data to determine the time value, and generate the encoded beacon ID 191 by performing a pseudorandom function using the session key, the beacon device identifier, and the time value.

In some implementations, the apparatus (e.g., the beacon device 110) further includes the receiver 120 coupled to the processor 112 and configured to receive messages from one or more mobile devices (e.g., 140). Additionally, or alternatively, the processor 112 is further configured to initiate transmission of a message (e.g., 190) that includes the encoded beacon ID 191. The message may include a message authentication code (MAC). In a particular implementation, the transmitter is configured to broadcast the message (e.g., 190) to transmit the encoded beacon ID 191 to the mobile device 140. Additionally, or alternatively, the processor 112 is configured to determine a second time value subsequent to the time value and generate a second encoded beacon identifier (ID) based on the beacon device identifier and the second time value. In such an implementation, the transmitter 122 is further configured to transmit the second encoded beacon ID to the mobile device 140.

In another particular aspect of the system 100 of FIG. 1, an apparatus (e.g., the mobile device 140) includes the memory 144 configured to store the mapping data structure 154 received from the server 160. The mapping data structure 154 is associated with a time period and includes a plurality of encoded beacon identifiers (IDs). Each encoded beacon ID of the plurality of encoded beacon IDs mapped to a corresponding beacon device identifier. The apparatus (e.g., the mobile device 140) also includes the receiver 146 configured to receive the encoded beacon ID 191 from the beacon device 110. The encoded beacon ID 191 is generated based on the beacon device identifier 136 of the beacon device 110 and a time value. The apparatus (e.g., the mobile device 140) further includes the processor 142 coupled to the memory 144 and the receiver 146. The processor 142 is configured to determine whether the encoded beacon ID 191 is included in (or indicated by) the mapping data structure 154.

In some implementations, the apparatus (e.g., the mobile device 140) also includes a positioning system (e.g., the location device 149) coupled to the processor 142 and configured to generate the location data 195 associated with a physical position of the positioning system (e.g., 149) or a physical position of the mobile device 140. The apparatus (e.g., the mobile device 140) may also include the transmitter 148 configured to send the location data 195 to the server 160. The receiver 146 is configured to receive the mapping data structure 154 from the server 160 and the mapping data structure 154 may be generated based on the location data 195.

In some implementations, the processor 142 is further configured to, in response to a determination that the encoded beacon ID 191 is not included in the mapping data structure 154, discard the encoded beacon ID 191 or initiate transmission of a look-up request (e.g., 195) that includes the encoded beacon ID 191 to the server 160. In a particular implementation, the look-up request includes an indication that the encoded beacon ID 191 was found to be invalid. Additionally, or alternatively, the memory 144 is further configured to store beacon data associated with a plurality of beacon devices, and the processor 142 is further configured, in response to a determination that the encoded beacon ID 191 is included in the mapping data structure 154, to identify, based on the mapping data structure 154, a beacon device identifier that corresponds to the encoded beacon ID 191, and to identify, based on the beacon device identifier, a portion of the beacon data that corresponds to the beacon device 110.

In some implementations of the mobile device 140, the memory 144 is further configured to store a second mapping data structure includes a second plurality of encoded beacon identifiers (IDs). Each encoded beacon ID of the second plurality of encoded beacon IDs mapped to a corresponding beacon device identifier. The second mapping data structure associated with a second time period that is distinct from the time period. In such implementations; the receiver 146 is configured to receive a second encoded beacon ID from the beacon device 110, and the processor 142 is further configured to determine whether the second encoded beacon ID is included in the second mapping data structure.

In another particular aspect of the system 100 of FIG. 1, an apparatus (e.g., the server 160) includes the processor 162 configured to generate an encoded beacon identifier (ID) based on a beacon device identifier and a time value. The apparatus also includes the memory 164 coupled to the processor 162 and configured to store a mapping data structure 154 that maps the encoded beacon ID to the beacon device identifier. The mapping data structure 154 is associated with a time period. The apparatus further includes the transmitter 168 coupled to the processor 162 and configured to transmit the mapping data structure 154 to the mobile device 140. In some implementations, the apparatus further includes the receiver 166 coupled to the processor 162 and configured to receive, from the beacon device 110, beacon device data, where the beacon device data includes the beacon device identifier, beacon device location data, a device type, or a combination thereof. Additionally, or alternatively, the processor 162 is further configured to identify a session key for use with the beacon device 110 and to generate the encoded beacon ID based on the session key and using a pseudorandom function, and the memory 164 is further configured to store the session key and a beacon device database that includes an entry for the beacon device 110. Additionally, or alternatively, the processor 162 is further configured to generate a second encoded beacon ID based on the beacon device identifier and second time value, and the memory 164 is further configured to store a second mapping data structure that maps the second encoded beacon ID to the beacon device identifier, where the second mapping data structure associated with a second time period that is distinct from the time period.

Each of the processors 112, 142, 162 may be configured to execute software (e.g., a program represented by one or more of the instructions 130, 152, 178) stored in a corresponding memory 114, 144, 164 (e.g., a non-transitory computer readable medium). For example, the processors 112, 142, 162 with one or more of the methods of FIGS. 3A-3C, 4-13, as described herein. To illustrate, the processor 112 may be configured to execute the instructions 130 that cause the processor 112 to: identify a beacon device identifier of the beacon device 110 and a time value, generate an encoded beacon identifier (ID) based on the beacon device identifier and the time value, and initiate transmission of the encoded beacon ID 191 to the mobile device 140.

As another example, the processor 142 may be configured to execute the instructions 152 that cause the processor 142 to receive, from the server 160, the mapping data structure 154, the mapping data structure 154 associated with a time period and includes a plurality of encoded beacon identifiers (IDs), each encoded beacon ID mapped to a corresponding beacon device identifier, to receive, from the beacon device 110, an encoded beacon ID, the encoded beacon ID generated based on a beacon device identifier of the beacon device and a time value, and to determine whether the encoded beacon ID is included in the mapping data structure 154.

As another example, the processor 162 may be configured to execute the instructions 178 that cause the processor 162 to generate an encoded beacon identifier (ID) based on a beacon device identifier of the beacon device 110 and a time value, to generate the mapping data structure 154 that maps the encoded beacon ID to the beacon device identifier, the mapping data structure 154 associated with a time period, and initiate transmission of the mapping data structure 154 to the mobile device 140.

As described with reference to FIG. 1, the beacon device 110 advertises a beacon identifier, such as an encoded beacon ID 191, that is based on the beacon device ID 136.

Generation of the encoded beacon ID 191 may include applying one or more security measures (e.g., a pseudorandom function) to prevent unauthorized access of the system 100, the beacon device 110, messages transmitted by the beacon device 110, or a combination thereof. The server 160 is configured to store and manage corresponding beacon data (e.g., 184, 186, 188) associated with the encoded beacon ID 191, such as data associated with the beacon device 110 (e.g., the device ID 136). In some implementations, the beacon data can be the coordinate of the of beacon device 110, type, name, etc. After the mobile device 140 reports its location to the server 160, the server 160 may retrieve a beacon ID and beacon data from its database (e.g., 184) based on the device location and some other predefined criteria associated with the mobile device 140. The retrieved data may be sent to mobile device 140 which saves the data to its memory 144 so that, when the encoded beacon ID 191 is detected, the mobile device 140 can look up the beacon data from the memory 144 before having to contact the server 160. In some implementation, the mobile device 140 may also perform a filtering technique in order to decrease the unnecessary requests to the server 160.

One advantage provided by the system 100 of FIG. 1 is that the system 100 provides a secure location based service along with a number of security mechanisms and protocols to defend against security threats, such as spoofing attacks, piggybacking attacks, and re-programming attacks. To illustrate, the beacon device 110 is configured to update its beacon ID (to generate encoded beacon IDs). By changing the beacon ID (and appearing to provide a random beacon ID), the system 100 is able to defend against piggybacking attacks which rely on identification and continued use of a beacon ID to enable the attackers unauthorized use of the system. Additionally, the beacon device 110 implements a pseudorandom function, or other encryption technique, to generate the encoded beacon ID (e.g., 191), a message (e.g., 190), or packet, that includes the beacon ID, or both. The pseudorandom function, or other encryption technique, may include a MAC that, when included in the encoded beacon ID (or in a message or packet that includes the beacon ID), the encoded beacon device is able to defend against spoofing attacks by enabling other devices (e.g., the mobile device or the server) to validate the beacon ID based on the MAC. Additionally, a device of the system 100 may establish a secure connection with another device of the system 100 to ensure that the other device is authorized to communicate with the beacon device. Such authentication reduces a likelihood of the beacon device 110 being subjected to a re-programming attack. Successful mitigation of such attacks (e.g. spoofing attacks, piggybacking attacks, and re-programming attacks) improves operation and reliance of a location based services system, deters potential attacks which reduces overhead communication between devices, and improves efficiency and power usage of individual devices included in the system.

Referring to FIGS. 2A-2F, examples of data structures usable by the system of FIG. 1 are depicted. Although each of the data structures is depicted as a table, this is for illustration purposes and is not intended to be limiting. Accordingly, it will be appreciated that data structure formats other than a table may be used.

Referring to FIG. 2A, an example of a mapping data structure 200 that maps beacon device identifiers (e.g., UUIDs) to encoded beacon IDs, such as encoded beacon IDs generated using a time value, a pseudorandom code, or both, is depicted. The mapping data structure 200 may include or correspond to the mapping data structure 154 of FIG. 1. The mapping data structure 200 may be stored at the server 160, the mobile device 140, or both.

Referring to FIG. 2B, an example of a mapping data structure 210 that maps beacon device identifiers (e.g., UUIDs) to beacon data is depicted. The mapping data structure 210 may include or correspond to the beacon device database 184 of FIG. 1. For example, the beacon device identifiers and the beacon data may include or correspond to the beacon IDs 186 and the beacon device data 188, respectively. The mapping data structure 210 may be stored at the server 160, the mobile device 140, or both.

Referring to FIG. 2C, an example of a tracking data structure 220 that tracks mobile device information is depicted. For a particular mobile device, the tracking data structure 220 may include one or more criteria, such as the criterion 182, a last report time of the mobile device, and a latest location (e.g., as reported by the mobile device). As shown, the tracking data structure 220 also indicates data sent and data to send to the mobile device. In a particular implementation, the data sent may include or correspond to a mapping data structure (e.g., 154) generated based on a previous location of the mobile device, and data to be send may include or correspond to a mapping data structure (e.g., 154) generated based on a the latest location of the mobile device. The tracking data structure 220 may be stored at the server 160.

Referring to FIG. 2D, an example of a tracking data structure 230 that tracks and determines beacon IDs for a particular beacon device is depicted. For a particular beacon device, the tracking data structure 230 includes past beacon IDs, a current beacon ID, future beacon IDs, or a combination thereof. As shown, for each beacon ID, the tracking data structure 230 includes a time T, the time T in a first format, and a truncated version of the time T (from the first format) used to generate the beacon ID, and a time difference between a prior beacon ID. The tracking data structure 220 may be stored at the server 160 or the beacon device 110.

Referring to FIG. 2E, an example of a set of mapping data structures 240-260 that each maps beacon device identifiers (e.g., UUIDs) to encoded beacon IDs, such as encoded beacon IDs generated using a time value, a pseudorandom code, or both, is depicted. Each mapping data structure of the set of mapping data structure 240-260 may be associated with or correspond to a different time (or a different time period), which may account for synchronization issues in the system 100. As an illustrative, non-limiting example, the mapping data structure 240 may be valid for a first time period of thirty minutes and each of the mapping data structures may be valid for a second time period of one hour. In other implementations, each of the mapping data structures 240-260 is valid for the same amount of time or until the set of mapping data structures 240-260 is updated (e.g., replaced) with a different set of mapping data structures. The set of mapping data structures 240-260 may include or correspond to the mapping data structure 154 of FIG. 1. The set of mapping data structures 240-260 may be stored at the server 160, the mobile device 140, or both.

The set of mapping data structure 270 is similar to, and may be generated based on, the mapping data structure 200 of FIG. 2A, the tracking data structure 230 of FIG. 2D, or both. As compared to the mapping data structure 200 (which includes information for all beacon devices known to the server 160), each of set of the mapping data structures 240-260 may be generated for a particular mobile device, based on the particular mobile device's location, and thus may include information for less than all of the beacon devices known to the server 160.

Referring to FIG. 2F, an example of a mapping data structure 270 that maps beacon device identifiers (e.g., UUIDs) to beacon data is depicted. The mapping data structure 210 may include or correspond to the beacon device database 184 of FIG. 1. For example, the beacon device identifiers and the beacon data may include or correspond to the beacon IDs 186 and the beacon device data 188, respectively. The mapping data structure 210 may be stored at the server 160, the mobile device 140, or both.

The mapping data structure 270 is similar to, and may be generated based on, the mapping data structure 210 of FIG. 2B. As compared to the mapping data structure 210 (which includes information for all beacon devices known to the server 160), the mapping data structure 270 may be generated for a particular mobile device, based on the particular mobile device's location, and thus may include a sub-set of information for less than all of the beacon devices known to the server 160. Accordingly, sending the mapping data structure 270 to the mobile device, as compared to sending the mapping data structure 210 of FIG. 2B, may use less communication overhead.

The data structures of FIGS. 2A-2F enables the system (e.g., 100) that provides a secure location based service along with a number of security mechanisms and protocols maintain coordination between different devices of the system and to defend against security threats, such as spoofing attacks, piggybacking attacks, and re-programming attacks. To illustrate, the data structures of FIGS. 2A-2F enable coordination amongst different devices of the system to support the beacon device (e.g., 110) updating its beacon ID based on a time value, a pseudo random code, or both, as illustrative, non-limiting examples.

Figures 3A, 3B:
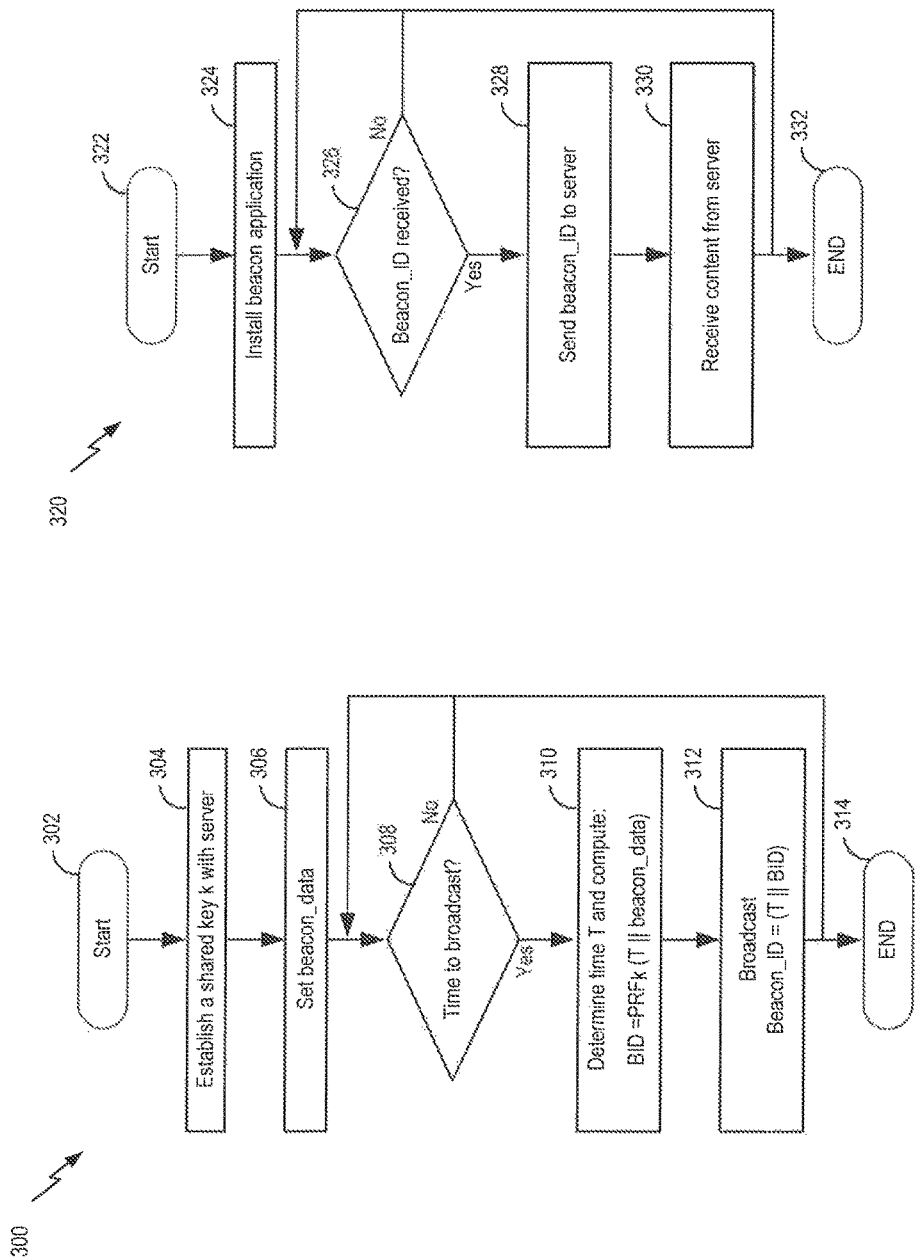
FIGS. 3A-3C are flowcharts of illustrative examples of methods of operation of devices of the system of FIG. 1 for evolving beacon ID generation.
Figure 3C:
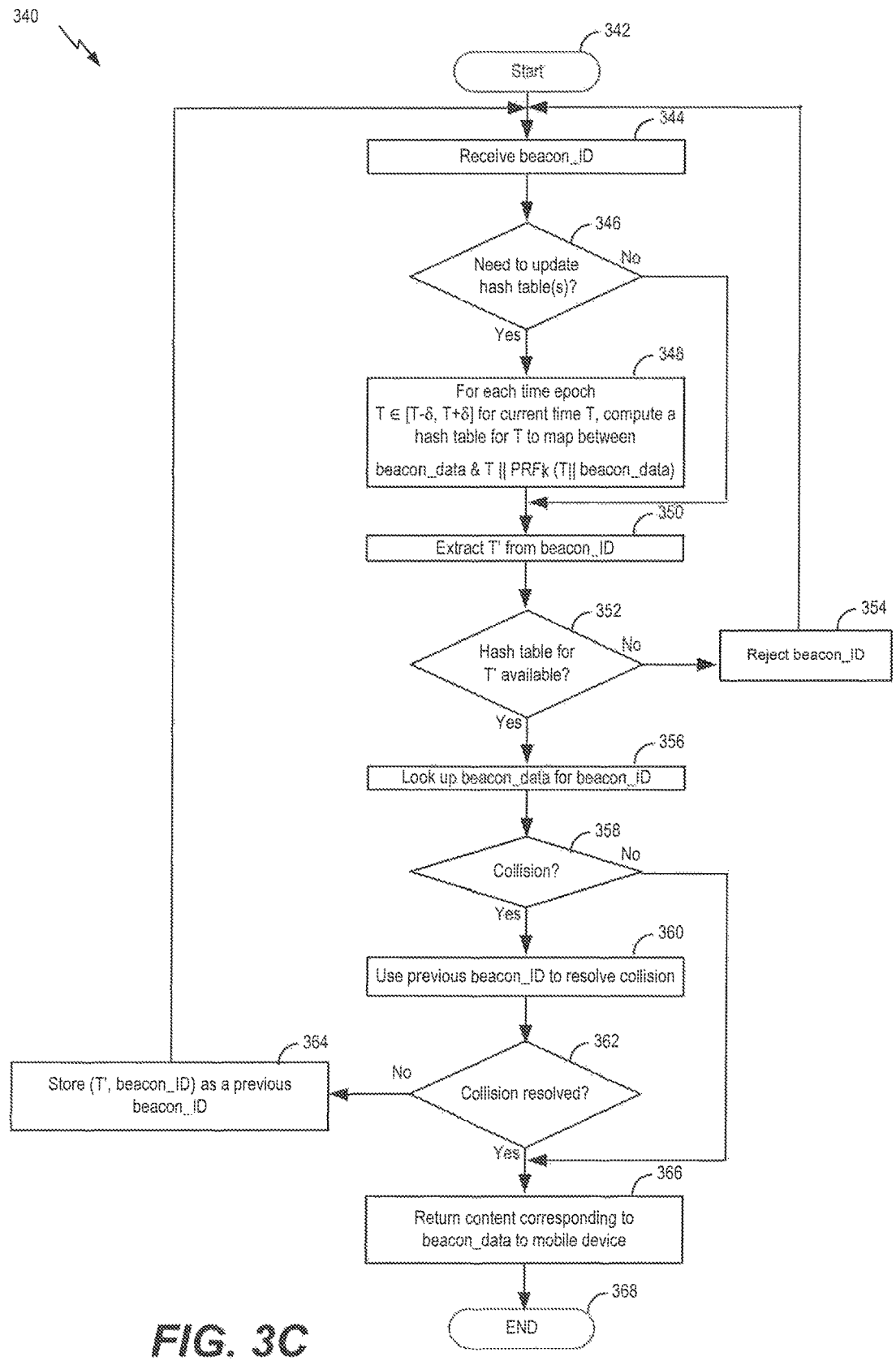

Referring to FIGS. 3A-3C, methods of operation of operation of devices of the system 100 of FIG. 1 are shown. The method of FIGS. 3A-3C enable generation and coordination of encoded beacon IDs, such as beacon ID 191 of FIG. 1. For example, FIG. 3A includes a method 300 of operation of the beacon device 110, FIG. 3B includes a method 320 of operation of the mobile device 140, and FIG. 3C includes a method of operation of the server 160.

Referring to FIG. 3A, the method 300 of operating the beacon device 110 begins at 302 and includes establishing a shared key k (e.g., a secret key) with the server, at 304. The method 300 includes setting beacon_data, at 306. The beacon_data may be stored in the memory 114, communicated to server 160, or both. The beacon_data may include device ID 136, a device type, a device name, a major value, a minor value, coordinates (e.g., latitude and longitude), or a combination thereof, as illustrative, non-limiting examples. The beacon_data may have a format based on a type of beacon (e.g., beacon data type) used. For example, the beacon type may include iBeacon, EddyStone, or a proprietary type (e.g., a customer specific type). The iBeacon type has a format of 16 bytes Proximity UUID+2 bytes Major+2 bytes Minor. In some implementations, the beacon_data may include the UUID and not the major and minor values. In other implementations, the beacon_data may include the major and minor values, but not the UUID. The EddyStone type has a format of a static ID with a 10-byte Namespace component+a 6-byte Instance component. A proprietary type may have a customized ID format.

The method 300 includes determining whether it is time to broadcast an encoded beacon ID, at 308. If a determination is made that it is not time to broadcast, the method 300 advances again to 308. Alternatively, if a determination is made that it is time to broadcast, the method 300 includes determining a time T (e.g., a time value) and computing an encoded beacon_ID, at 310. The encoded beacon_ID (BID) may be computed as BID=$PRF_k$ (T∥beacon_data), where PRF is a pseudorandom function, $PRF_k$ denotes a pseudorandom function that uses the shared key k, "∥" means append, and (T∥beacon_data) is referred to as an input of $PRF_k$. The $PRF_k$ may generate an output value (e.g., an output string y) having a fixed value that is computationally indistinguishable from a randomly chosen bit string. As long as the shared key is kept secret, other inputs to the PRF may be publically known without compromising security of the PRF. Illustrative, non-limiting examples of pseudorandom function PRF include AES-OMAC and SHA-HMAC. Additionally, the PRF operates as a MAC against message attacks. That is, given a message m, $PRF_k$(m) can be used as a MAC tag for protecting the integrity of message m.

The method 300 includes broadcasting a beacon packet that includes a beacon value (Beacon_ID)=(T∥BID), at 312. The beacon value (Beacon_ID) may include or correspond to the beacon ID 191 of FIG. 1. In some implementations, the beacon packet value (Beacon_ID) may equal BID and T may not be appended. After broadcasting the beacon packet, such as the message 190, the method 300 may advance to 308 or may end at 314.

In some implementations, the Beacon_ID that is broadcast is generated from a PRF in the following form (T, $PRF_k$(beacon_data∥T), location_data), where T is the current time in a pre-defined format and the tuple location_data is part of beacon data. For example, the beacon data of iBeacon is (UUID(16B), Major (2B), Minor (2B), TX_Power (1B)), and (Major, Minor) may include the location data. It is noted that inclusion of the location_data in the generated beacon ID is optional and other implementations may not include the location_data.

In other implementations, such as for the case of iBeacon, instead of using UUID as the beacon_ID, the PRF is used to generate the beacon ID from UUID, Major, Minor, T. For example, the beacon_ID is (T, $PRF_k$(UUID∥Major∥Minor)). In the case of iBeacon, T and y could be truncated to fit in the original fields of UUID, Major, and Minor. For other beacon technologies, such as Eddystone, truncation optionally be applied. To illustrate, the last 4 bits of T along with a truncated output of AES-OMAC, such as the last 156 bits, can form the beacon_ID to fill the 20 bytes of UUID, Major, and Minor. A 4-bit T can enable the server to build 16 mapping data structures (e.g., hash tables) for the nearby time epochs to allow relaxed time synchronization. For a 160-bit beacon ID, PRF image collision is negligible. The inclusion of the optional field of location_data may lower PRF image collision.

The method 300 of FIG. 3A enables the beacon device (e.g., 110) to generate an encoded beacon ID that appears random. For example, the indistinguishability of PRF ensures that, without knowledge of key k, each beacon ID looks like an unpredictable random string, thus hindering piggybacking attacks. In addition, the PRF functions as a MAC to protect the integrity of the input of the PRF, such as beacon_data∥T. In implementations that use iBeacon, $PRF_k$(UUID∥Major∥Minor∥TX_Power∥T) also acts as a MAC tag for verifying the authenticity of UUID∥Major∥Minor∥TX_Power∥T, further deterring and prohibiting spoofing attacks. Additionally, without knowledge of the key k, it is not possible to generate a correct PRF image from a received beacon message that includes the encoded beacon ID. The inclusion of the time T in the beacon message (e.g., beacon packet) further deters and prohibits playback attacks. To illustrate, an encoded beacon ID, though correctly validated in the PRF-MAC verification, may still be rejected if T falls beyond an acceptable window around the current time at the server 160. Accordingly, by changing the beacon ID (and appearing to provide a random beacon ID), the system is able to defend against piggybacking attacks which rely on identification and continued use of a beacon ID to enable the attackers unauthorized use of the system.

Referring to FIG. 3B, the method 320 begins at 322 and includes installing a beacon application at the mobile device 140, at 324. The beacon application may be associated with or correspond to a location based server. The method 320 also includes determining whether a beacon_ID is received from a beacon device, such as the beacon device 110, at 326. For example, referring to FIG. 1. If a determination is made that a beacon_ID is not received, the method 320 advances again to 326. Alternatively, if a determination is made that a beacon_ID is received, the method 320 includes sending the beacon_ID to the server, at 328.

The method 320 further includes receiving content from the server, at 330. The content may correspond to the beacon application. After receiving the content, the method 320 may advance to 326 or may end at 332.

In some implementations, after receiving the beacon_ID (at 320) and prior to sending the beacon_ID to the server (at 328), the method 320 may include performing a filtering operation based on the beacon_ID, performing a look-up operation on a mapping data structure using the beacon_ID, or both. The filtering operation may be performed by the processor 142 (e.g., the filter 150) and the mapping data structure may include or correspond to the mapping data structure 154.

The method 320 of FIG. 3B enables the mobile device 140 to operate in a system, such as the system 100, in which the beacon device 110 generates and transmits encoded beacon messages, as described with reference to at least the method 300 of FIG. 3A.

Referring to FIG. 3C, the method 340 begins at 342 and includes receiving a beacon_ID, such as the beacon ID 191, at 344. The method 340 include determining whether a hash table(s) needs to be updated, at 346. The hash table(s) may include or correspond to the mapping data structures 154. In some implementations, a number of hash tables are maintained at the server for looking up beacon data from a received beacon ID. Each hash table may correspond a particular time T and may include pre-computed beacon IDs for one or more beacon devices. For a time T, the hash tables for nearby time epochs are kept to handle the time synchronization issues. For example, a beacon device that generates a beacon ID and the server may not have a common clock, accordingly drift may occur between the clocks of the beacon device and the server. Keeping has tables for nearby time epochs allows for drift which may result in the beacon device updating the beacon ID before or after the sever updates the beacon ID. If a determination is made that the hash table(s) does not need to be updated, the method 340 advances to 350. Alternatively, if a determination is made that the hash table(s) needs to be updated, the method 340 includes generating one or more updated hash tables, at 348. Generating the one or more updated hash tables includes, for each time epoch T∈[T−δ, T+δ] for current time T, where δ is an amount of time, compute a hash table for T to map between beacon_data and beacon_ID, such as (T∥$PRF_k$(T∥beacon_data)).

The method 340 also includes extracting a time value T' from the received beacon_ID, at 350. The method 340 include determining whether a hash table is available for T', at 352. If a determination is made that no hash table is available for T', the method 340 includes rejecting the beacon_ID, at 354, and advances to 344. Alternatively, if a determination is made that a hash table is available for T', the method 340 includes looking up beacon_data for the beacon_ID, at 356.

The method 340 includes determining where a collision is present, at 358. If a determination is made that no collision is present, the method 340 includes returning content correspond to beacon_data to the mobile device, at 366, and the method 340 ends at 368. Alternatively, if a determination is made that a collision is present, the method 340 includes using a previous beacon_ID to try to resolve the collision, at 360.

The method 340 further includes determining whether the collision is resolved, at 362. If a determination is made that the collision is not resolved, the method 340 includes storing (T', beacon_ID) as a previous beacon_ID, and the method 340 advances to 344. Alternatively, if a determination is made that the collision is resolved, the method 340 includes returning content correspond to beacon_data to the mobile device, at 366, and the method 340 ends at 368.

The method 340 of FIG. 3C enables the server 160 to operate in a system, such as the system 100, in which the beacon device 110 generates and transmits encoded beacon messages, as described with reference to at least the method 300 of FIG. 3A. Additionally, the method 340 enables the server 160 to look up a beacon ID (e.g., an encoded beacon ID) and verify its authenticity based on the MAC. The server 160 may advantageously provide content to the mobile device 140 based on an authenticated beacon.

Figure 4:
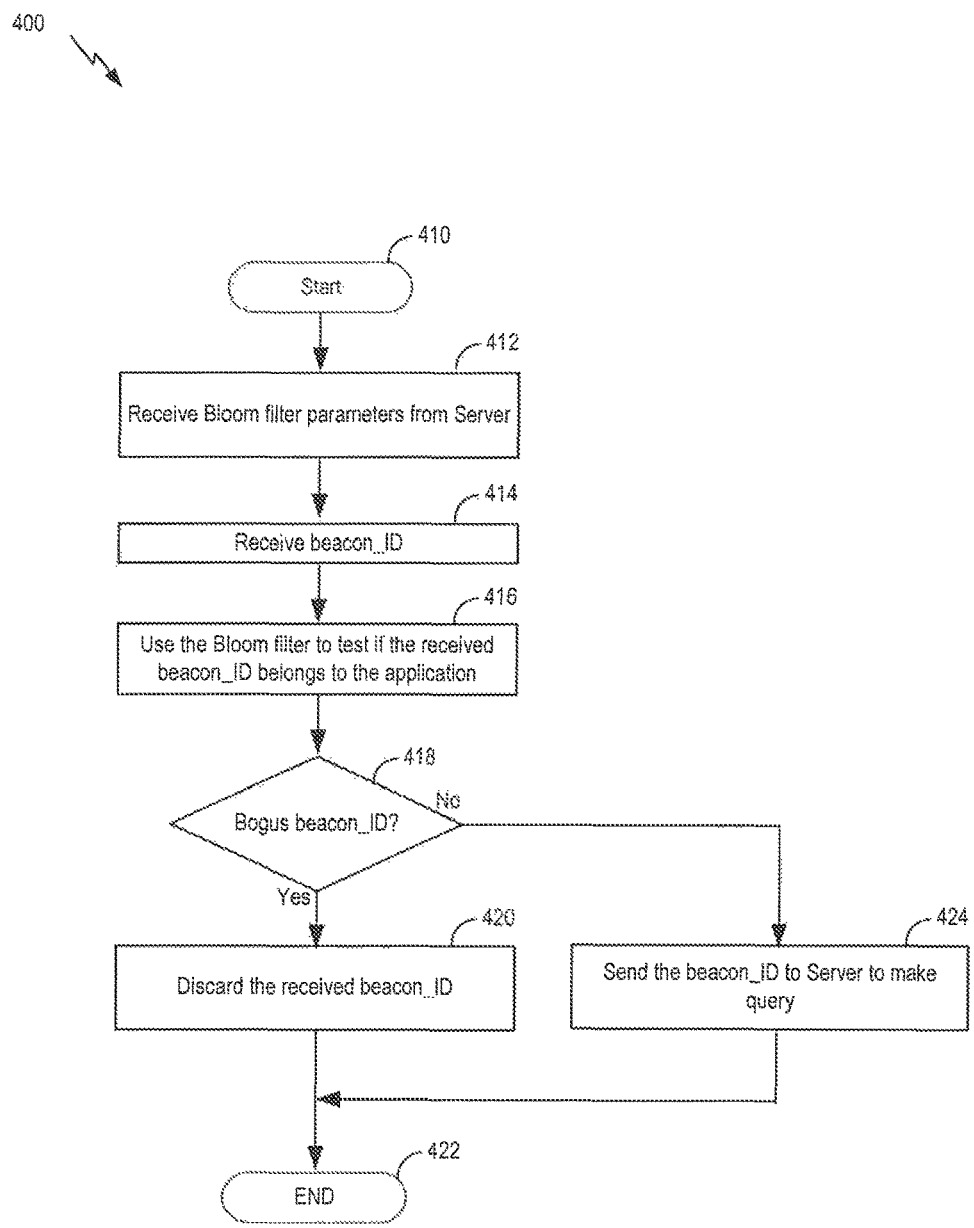
FIG. 4 is a flowchart of an illustrative example of a method for bogus beacon ID filtering.

Referring to FIG. 4, a method 400 of operation at a mobile device is shown. For example, the method 400 may be related to a method for wireless communication, such as wireless communication associated with a location based service. The method 400 may be performed at the mobile device 140 of FIG. 1 to filter bogus (e.g., invalid) beacon IDs.

The method 400 begins at 410 and includes receiving bloom filter parameters from a server, such as the server 160, at 412. The bloom filter parameters may include or correspond to the filter parameters 197 of FIG. 1. The method 400 also includes receiving a beacon_ID (e.g., the device ID 136 or the beacon ID 191) from a beacon device, such as the beacon device 110, at 414. For example, referring to FIG. 1, the mobile device 140 receives the beacon ID 191 from the beacon device 110.

At 416, the method 400 includes using a Bloom filter to test if the received beacon_ID belongs to an application (e.g., a beacon application stored at a memory of the mobile device). For example, the Bloom filter may include or correspond to the processor 142 (e.g., the filter 150) of FIG. 1. At 418, if the beacon_ID is determined to be bogus (e.g., invalid), the method 400 includes discarding the received beacon_ID, at 420, and the method 400 ends at 422. Alternatively, if the beacon_ID is not determined to be bogus at 418, the method 400 includes sending the beacon_ID to the server to make a query, at 424, and the method 400 ends at 422. In some implementations, the mobile device may not send the beacon_ID to the server if the beacon_ID is not determined to be bogus at 418. For example, referring to FIG. 1, the mobile device 140 may instead access the mapping data structure 154, beacon device data, or both stored at the memory 144 of the mobile device 140.

The method 400 of FIG. 4 enables a mobile device (e.g., 140) to reduce communication overhead with a server (e.g., 160). To illustrate, because the beacon ID is unpredictably random now (as generated by PRF), the mobile device listens for beacon IDs, some of which may belong to other systems/owners. For example, the mobile devices may use a Bloom filter to test whether a given element belongs to a predefined set with zero false negative and thereby filter out bogus beacon IDs. Whenever the server updates its hash tables of beacon IDs, the server generates the parameters of a new Bloom filter by incorporating all beacon IDs in all current hash tables. The parameters are provided to the mobile device to test whether a given beacon ID belongs any one of the current hash tables. According, the Bloom filter enables the mobile device to discard beacon IDs that do not pass the filter operation, thus reducing a number of beacon IDs transmitting to the server and thereby advantageously saving communication overhead.

Figure 5:
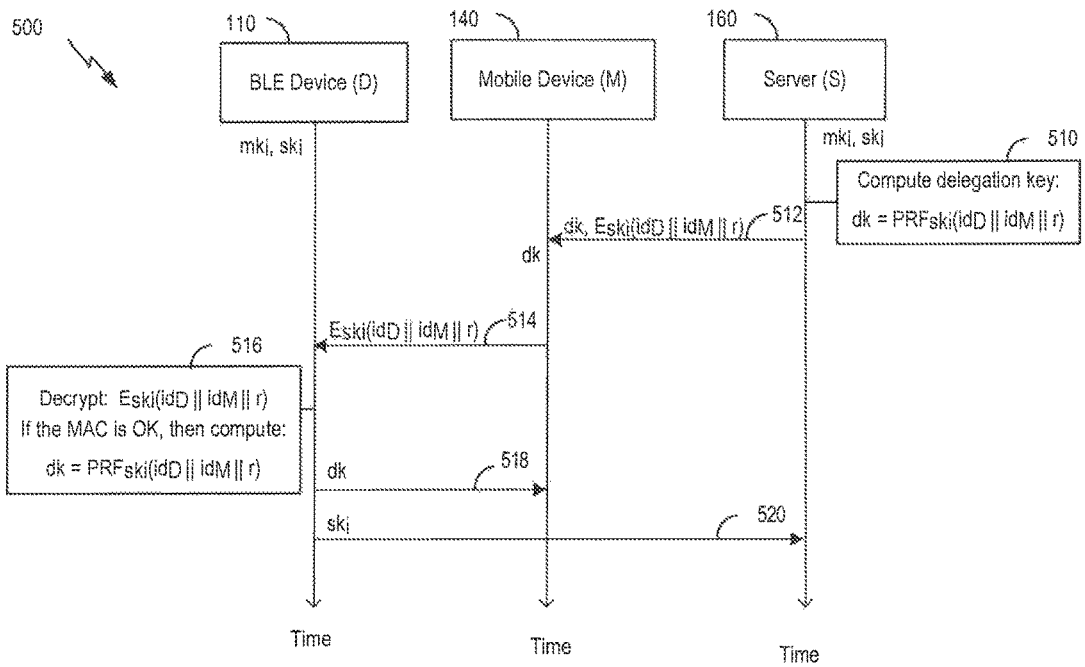
FIG. 5 is a ladder diagram illustrating an illustrative example of a key delegation protocol.
Figure 6:
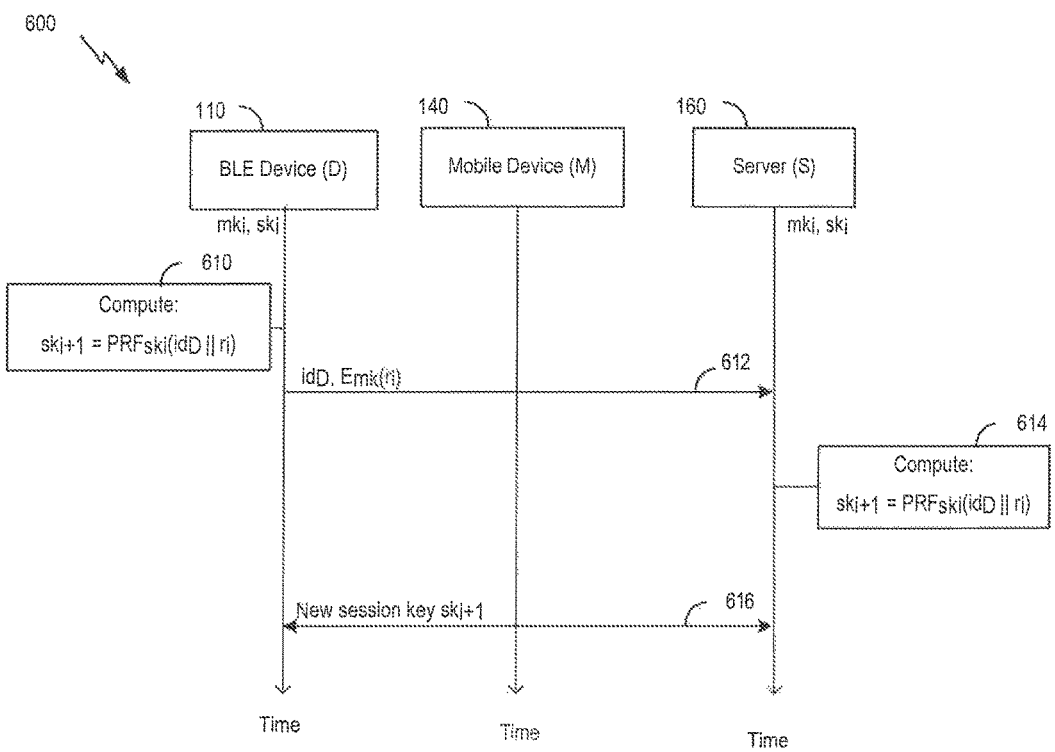
FIG. 6 is a ladder diagram illustrating an illustrative example of a key update protocol.
Figure 7:
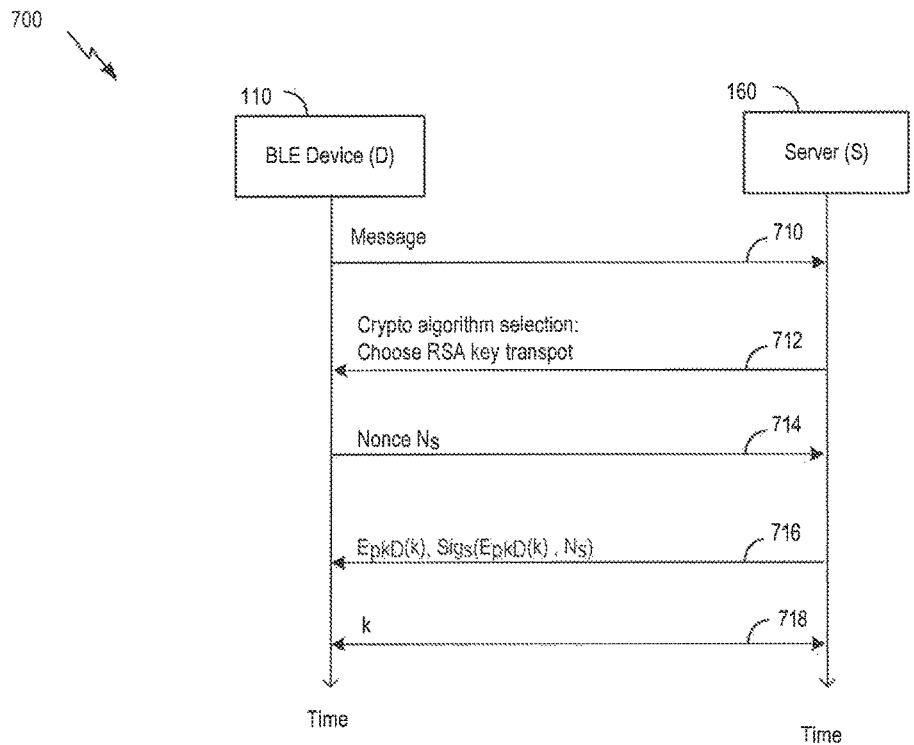
FIG. 7 is a ladder diagram illustrating an illustrative example of cryptography (using RSA (Rivest-Shamir-Adleman))
Figure 8:
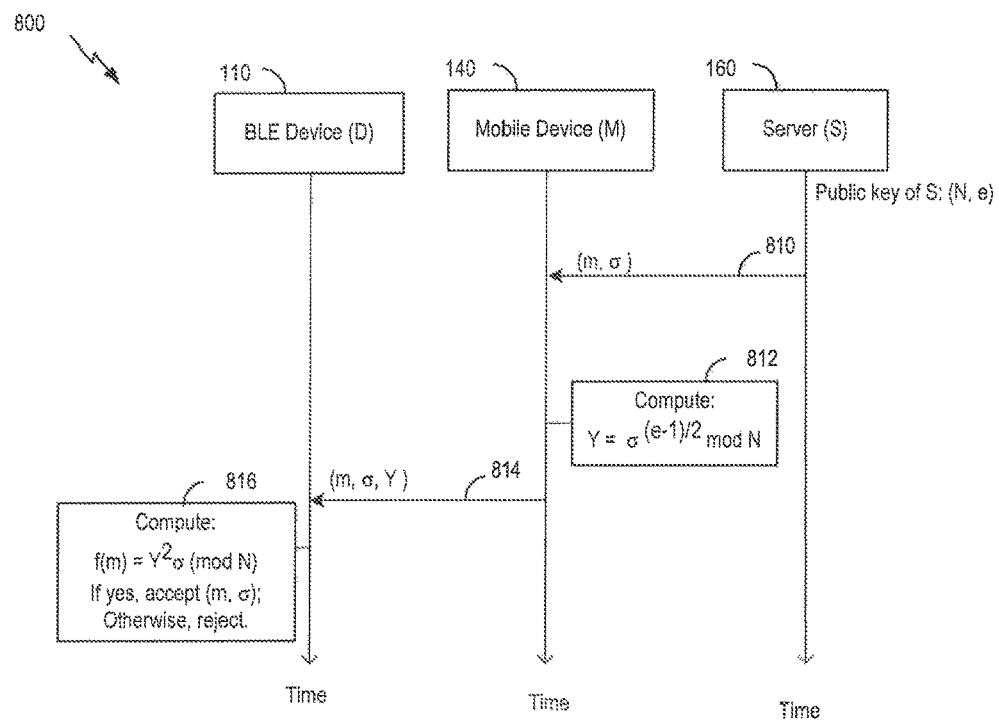
FIG. 8 is a ladder diagram illustrating an illustrative example of RSA signature verification.
Figure 9:
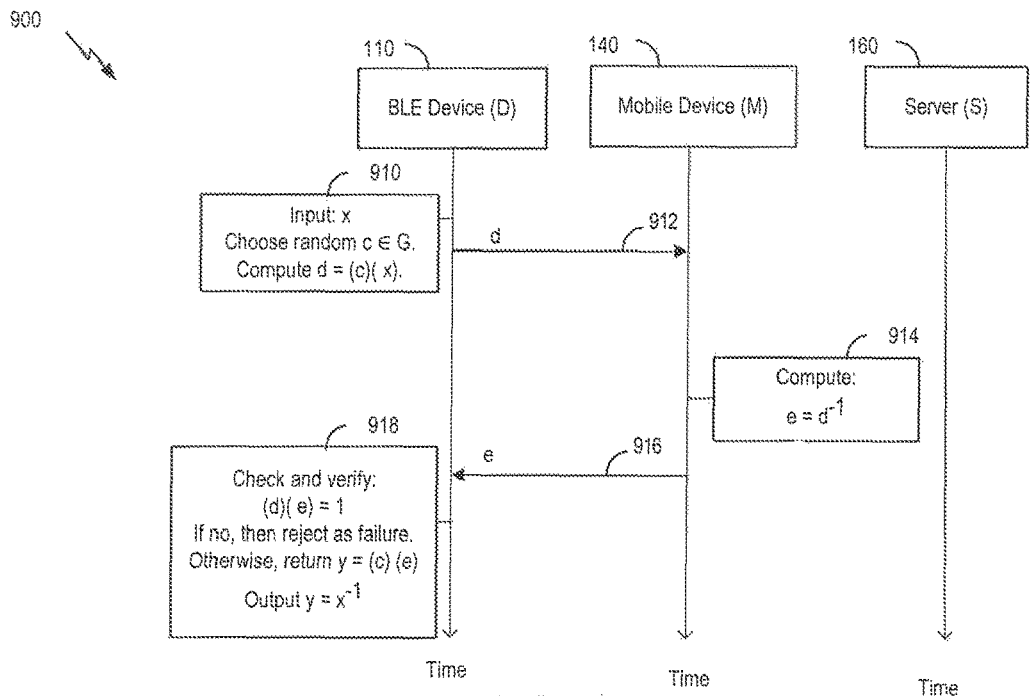
FIG. 9 is a ladder diagram illustrating an illustrative example of performing modular inverse ($C_{inv}$, $S_{inv}$) for use in RSA decryption.
Figure 10:
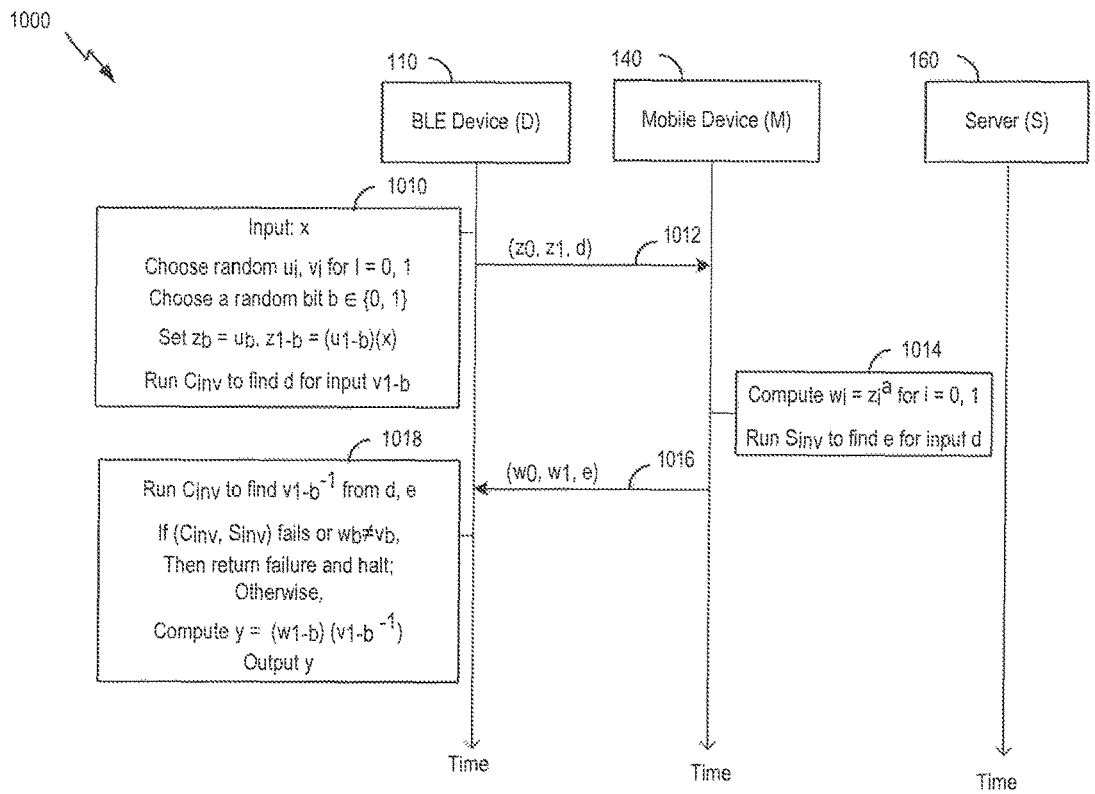
FIG. 10 is a ladder diagram illustrating an illustrative example of RSA decryption.

Referring to FIGS. 5-10, ladder diagrams illustrating operation of the system 100 are depicted. For example, a ladder diagram 500 of FIG. 5 depicts an example of a key delegation protocol and a ladder diagram 600 of FIG. 6 depicts an example of a key update protocol. The ladder diagrams of FIGS. 7-10 illustrate examples of secure communication of the system 100. For example, a ladder diagram 700 of FIG. 7 depicts an example of cryptography (using RSA), a ladder diagram 800 of FIG. 8 depicts an example of RSA signature verification, a ladder diagram 900 of FIG. 9 depicts an example of performing modular inverse ($C_{inv}$, $S_{inv}$) for use in RSA decryption, and a ladder diagram 1000 of FIG. 10 depicts an example of RSA decryption. The ladder diagrams of FIGS. 5-10 may include two or more of the beacon device 110 (e.g., a BLE device (D)), mobile device (M) 140, and server (S) 160.

Referring to FIG. 5, the ladder diagram 500 depicts an example of a key delegation protocol. During operation of the system 100, prior to a first time 510, each of the beacon device 110 and the server 160 includes a master key mk and a session key sk, where subscript i indicates an instance (e.g., a time instance). Typically, the server 160 can decrypt and verify messages sent from the beacon device 110. Such decryption and verification of messages send from the beacon device 110 may be delegated by the server 160 to another device, such as the mobile device 140.

At the first time 510, the server 160 computes a delegation key dk responsive to a request (not shown) from the mobile device 140. The delegation key dk may be computed as: dk=PRFski($id_D$||$id_M$||r), where $id_D$ is an identity of beacon device 110, $id_M$ is an identity of mobile device 140, and r is a random number chosen by the server 160.

At a second time 512, the server 160 transmits the delegation key dk and $E_{ski}$($id_D$||$id_M$||r) to the mobile device 140, where $E_{ski}$ is an encryption of $id_D$||$id_M$||r) using the session key $sk_i$. The mobile device 140 retains (e.g., stores) the delegation key and, at a third time 514, sends $E_{ski}$($id_D$||$id_M$||r) to the beacon device 110, where $E_{ski}$ is an encryption of $id_D$||$id_M$||r) using the session key $sk_i$. In some implementations, AES-CCM is used to instantiate E(•) and, therefore, $E_{ski}$($id_D$||$id_M$||r) includes a Message Authentication Code (MAC) tag which serves as proof of delegation from the server 160 to the mobile device 140. If the MAC tag is verified as correct, the beacon device 110 can compute the delegation key dk based on the decrypted content.

At a fourth time 516, the beacon device 110 decrypts $E_{ski}$($id_D$||$id_M$||r) and determines if the MAC is correct. If the MAC is not correct, the beacon device 110 does not establish the delegation key dk with the mobile device 140. In some implementations, if the MAC is not correct, the beacon device 110 notifies the mobile device 140. Alternatively, if the MAC is correct, the beacon device 110 computes the delegation key dk as: dk=PRFski($id_D$||$id_M$||r). The delegation key dk is shared between the beacon device 110 and the mobile device 140, and ski is shared between the beacon device 110 and the server 160. For content delegated to mobile device 140, the beacon device 110 uses the delegation key dk instead of the session key $sk_i$ for encryption. Since the delegation key dk leaks no information about the session key $sk_i$, the mobile device 140 is unable to determine the session key $sk_i$ from the delegation key dk, thus ensuring the security of the session key $sk_i$.

At a fifth time 518, the beacon device 110 communicates with the mobile device 140 using the delegation key. At a sixth time 520, the beacon device 110 communicates with the server 160 using the session key. Revocation of the delegation dk can be performed by the beacon device by reverting to the session key $sk_i$ for communications.

Thus, FIG. 5 demonstrates how secure communication can be established between the beacon device 110 and the mobile device 140. To illustrate, the shared secret key between the beacon device 110 and the server 160 is used to enable a challenge-response authentication between the beacon device and the mobile device. Accordingly, the server 160 can delegate the access (e.g., for updating beacon data, etc.) to a third party, such as the mobile device. In this manner, authorized devices may communicate, and potentially re-program, the beacon device. Therefore, unauthorized devices are prohibited from re-programming the beacon device, thus increasing security of a location based service that includes the beacon device 110.

Referring to FIG. 6, the ladder diagram 600 depicts an example of a key update protocol. During operation of the system 100, prior to a first time 610, each of the beacon device 110 and the server 160 includes a master key mk and a session key sk, where subscript i indicates an instance (e.g., a time instance). At a first time 610, the beacon device 110 initiates a key update procedure and computes an updated session key $sk_{i+1}$ as: $sk_{i+1}$=PRFski($id_D$||$r_i$), where $r_i$ is a random string, $id_D$||$r_i$ denotes a concatenation of idD (device identity) and ri, and PRF is a pseudorandom function. In some implementations, the beacon device 110 initiates the key update procedure based on a time-out mechanism or a pre-defined count of the messages that have been sent to the server 160 since the last key update.

At a second time 612, the beacon device 110 communicates the device identity $id_D$ and an encryption of $r_i$, denoted $E_{mk}(r_i)$, to the server 160. $E_{mk}(r_i)$ may be encrypted with the shared master key mk. In some implementations, the encryption of $r_i$ may be completed using AES-CCM. At a third time 614, after decrypting $E_{mk}(r_i)$, the server 160 calculates the updated session key $sk_{i+1}$ as: $sk_{i+1}$=PRF$_{ski}$($id_D$||$r_i$). At a third time 616, the beacon device 110 and the server 160 communicate using the updated session key $sk_{i+1}$.

Thus, FIG. 6 provides an example in which the beacon device 110 can update a shared key (e.g., a secret key) used for communication between the beacon device 110 and the server 160. To illustrate, the session key $sk_i$ is updated regularly by the beacon device 110 which also synchronizes the updated key with the server 160. A pseudorandom function (PRF) is used to derive the new session key $sk_{i+1}$ from the old session key $sk_i$ on input of the device identity $id_D$ and a newly picked random number $r_i$ (to improve the key entropy). It is noted that the shared key (e.g., the updated shared key) is also used to generate the encoded beacon IDs (e.g., evolving beacon_IDs) from the PRF. Updating the shared key increases the security and makes it more difficult for potential attackers to determine the shared key over time (a risk of the shared key becoming know becomes greater the longer the share key is used).

Referring to FIG. 7, the ladder diagram 700 depicts an example of cryptography (using RSA). Although not depicted, the beacon device 110 and the server 160 may communicate via one or more other devices (e.g., the mobile device 140). During operation of the system 100, the beacon device 110 sends a message (e.g., an advertisement message, a discover message, a beacon message, etc.) to the server 160 at a first time 710. At a second time 712, the server 160 sends an indication of a cryptography selection, such as an RS key transport protocol. At a third time 714, the beacon device 110 sends a nonce $N_s$ to the server 160. The server 160 is able to determine a shared secret key k based on the nonce $N_s$.

At a fourth time 716, the server 160 sends an encryption of the shared secret key k denoted $E_{pkD}(k)$ to the beacon device 110, where $E_{pkD}(k)$ may be encrypted with a public key $pk_D$ of the beacon device 110. In some implementations, the encryption of the shared secret key k may be completed using AES-CCM. At the fourth time 716, the server 160 also sends $Sigs(E_{pkD}(k), N_s)$ to the beacon device 110, where Sigs denotes a signature of the server 160.

After decrypting $E_{pkD}(k)$ and processing $Sigs(E_{pkD}(k), N_s)$ (e.g., performing signature verification), the server 160 calculates the shared secret key k. An example of RSA signature verification is described with reference to FIG. 8. At a fifth time 718, the beacon device 110 and the server 160 communicate using the shared secret key k.

Thus, FIG. 7 demonstrates a two-way secure communication channel between the beacon device 110 and another entity (e.g., the server 160), without prior contact, for establishing the shared secret key initially and bootstrapping. Asymmetric key primitives are desirable in some situations and an SSL/TLS channel is typically used for such a purpose. Extensive exponentiation steps involved in conventional protocols typically deter the resource-constrained beacon devices (low computational power, limited battery lifetime) from using the conventional protocols. However, using server aided cryptography as described herein with reference to FIGS. 7-10, the present disclosure enables the beacon device 110 to offload the expensive computation of RSA to the mobile device 140. Advantageously, the computational overhead is reduced from O(n3) to O(n2) where n is the modulus size, thereby making secure communication channel a viable option.

Referring to FIG. 8, the ladder diagram 800 depicts an example of RSA signature verification. During operation of the system 100, prior to a first time 810, the server 160 includes a server public key having including the modulus N and the verification exponent e. The server 160 generates a message m and a signature a, which are sent a the first time 810 to the beacon device 110 via the mobile device 140. In RSA signature verification, given a message m and a signature a, a recipient (e.g., the beacon device 110) checks whether $\sigma^e \equiv f(m) \pmod{N}$ where (N, e) is the public key including the modulus N and the verification exponent e, and f(•) is specific to the exact scheme which is typically a combination of some hash function(s) and some redundancy function(s) (for instance, RSA-PSS).

At a second time 812, the mobile device 140 computes an intermediate value Y as: $Y = \sigma^{(e-1)/2} \mod N$. Computing the intermediate value Y reduces computational complexity at the beacon device 110. At a third time 814, the mobile device sends the message m, the signature σ, and the intermediate value Y to the beacon device 110. At a fourth time 816, performs verification by computing $f(m) = Y^2 \sigma \pmod{N}$. If verification occurs, the beacon device 110 accepts the message m and the signature a. Alternatively, if verification does not occur, the beacon device 110 rejects the message m and the signature a.

Thus, FIG. 8 demonstrates a protocol for RSA signature verification. As shown, the protocol reduces the computation on the beacon device 110 from O(n3) for exponentiation (typical complexity for RSA signature verification) to O(n2) for the two multiplication operations. Accordingly, FIG. 8 provides a simple and energy efficient protocol for the beacon device to use RSA signature verification.

Referring to FIG. 9, the ladder diagram 900 depicts an example of performing modular inverse ($C_{inv}$, $S_{inv}$) for use in RSA decryption. For example, given an input x, the beacon device 110 is to compute the inverse y and would like to delegate a portion of the computational (e.g., exponential) processing to the mobile device 140 without letting the mobile device 140 know the input x.

During operation of the system 100, at a first time 910, the beacon device 110 chooses a random number c∈G, where G is a given finite group to which the input x belongs. At the first time 910, the beacon device 110 also calculates a first value d as: d=(c)(x). The beacon device 110 sends the first value d to the mobile device 140, at a second time 912, and the mobile device 140 is unaware of the input x when given the first value d (e.g., given d, it is not possible to find the input x without knowing the random number c. Communication of the first value at the second time 912 may also include a request for the mobile device 140 to perform computational (e.g., exponential) processing on the first value d. At a third time 914, the mobile device 140 determines a second value e as: $e = d^{-1}$, and communicates the second value e to the beacon device, at a fourth time 916.

At a fifth time 918, the beacon device 110 checks and verifies that: (d)(e)=1. If (d)(e)≠1, the beacon device 110 rejects the second value e. In response to rejecting the second value e, the beacon device 110 may perform computational (e.g., exponential) processing on the input x to determine an inverse of x, or may begin the process again and select another random value c. Alternatively, if (d)(e)=1, the beacon device 110 calculates a value y of the inverse of the input x as: y=(c)(e).

Thus, FIG. 9 demonstrates a protocol for performing modular inverse ($C_{inv}$, $S_{inv}$) for use in RSA decryption. As shown, the protocol reduces the computation on the beacon device 110. Accordingly, FIG. 9 provides a simple and energy efficient protocol for the beacon device 110 perform modular inverse operations in conjunction with the mobile device 140.

Referring to FIG. 10, the ladder diagram 1000 depicts an example of RSA decryption. The BLE beacon runs a server-aided RSA decryption with the mobile device to recover the shared session key chosen by the server through selecting random numbers to hide its RSA private key and sending the obfuscated results to the mobile device. The mobile device computes exponentiation on the obfuscated private key and sends the result back to the BLE beacon, which then de-obfuscates the results to obtain the decryption.

During operation of the system 100, at a first time 1010, the beacon device 110 identifies an input x to be decrypted. At the first time 1010, the beacon device 110 also chooses random $u_i$, $v_i$ for i=0, 1, and chooses a random bit b∈{0, 1}. At the first time 1010, the beacon device 110 also sets $z_b = u_b$, $z_{1-b} = (u_{1-b})(x)$, and runs $C_{inv}$ (as described above with reference to FIG. 9) to find d for input $v_{1-b}$. At a second time 1012, the beacon device 110 sends ($z_0$, $z_1$, d) to the mobile device 140.

At a third time 1014, the mobile device 140 computes $w_i$ as: $w_i=z_i^a$ for i=0, 1, where a is a known value. At the third time 1014, the mobile device 140 also runs $S_{inv}$ (as described above with reference to FIG. 9) to find e for input d. At a fourth time 1016, the mobile device 140 sends ($w_0$, $w_1$, e) to the beacon device 110.

At a fifth time, the beacon device 110 runs $C_{inv}$ (as described above with reference to FIG. 9) to find $v_{1-b}^{-1}$ from d, e. If ($C_{inv}$, $S_{inv}$) fails (as described with reference to FIG. 9), or if $w_b \neq v_b$, then the beacon device 110 returns a failure and stops. Alternatively, if no failure is detected, the beacon devices 110 calculates a value y as: $y=(w_{1-b})(v_{1-b}^{-1})$, and provides an output of y.

Thus, FIG. 10 demonstrates a protocol for performing RSA decryption. As shown, the protocol reduces the computation on the beacon device 110. To illustrate, the beacon device 110 runs a server-aided RSA decryption with the mobile device 140 to recover the shared session key chosen by the server 160 through selecting random numbers to hide the RSA private key and sending the obfuscated results to the mobile device 140. The mobile device 140 computes exponentiation on the obfuscated private key and sends the result back to the beacon device 110, which then de-obfuscates the results to obtain the decryption. Accordingly, FIG. 10 provides a simple and energy efficient protocol for the beacon device 110 perform of RSA decryption in conjunction with the mobile device 140.

Additionally, when a mobile device 140 makes queries to the server 160 with a received beacon ID, the server 160 would potentially be able to trace where the mobile device 140 (and its owner) has been by examining the queries made by the mobile device 140 since the server 160 knows the physical locations of a deployed beacon device. In order to protect the user privacy, private information retrieval (PIR) or oblivious transfer (OT) is implemented to protect user privacy. To illustrate, the server 160 may arrange beacon device content as a database indexed by the updated beacon ID. Accordingly, the mobile device 140 can use a particular beacon ID (e.g., an encoded beacon ID) as index to run a PIR with the server 160. Due to the security property of PIR, the server would deliver the content pointed to by the beacon D, but cannot learn which index the mobile device 140 has queried. Accordingly, the techniques described herein enable the system (e.g., 100) of a location based service to maintain user privacy (e.g., mobile device privacy).

Figure 11:
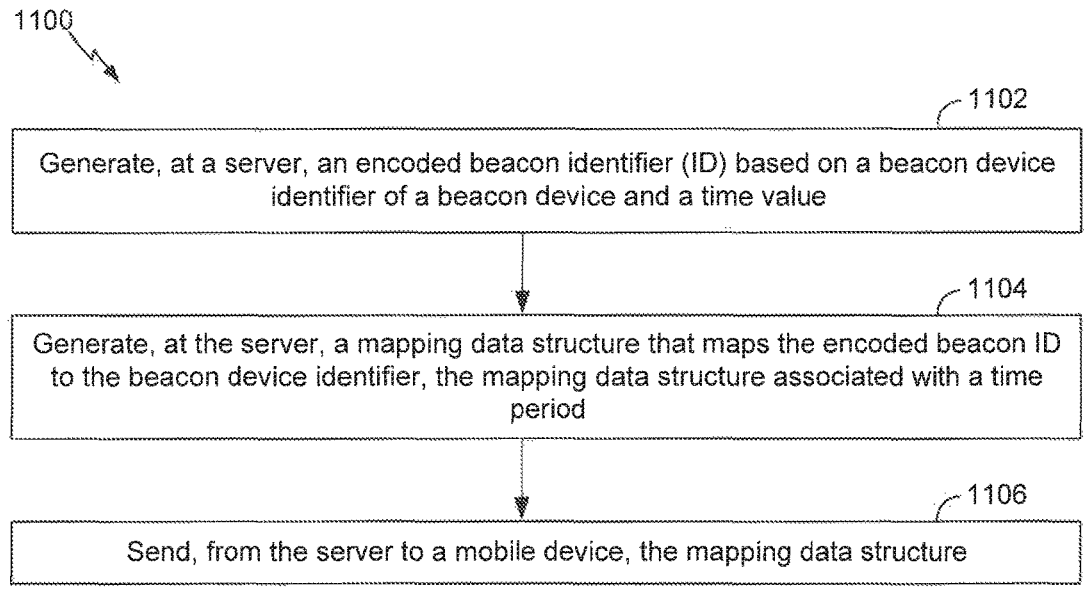
FIG. 11 is a flowchart of an illustrative method of operation of a server.

Referring to FIG. 11, a method 1100 of operation at a server is shown. For example, the method 1100 may be related to a method for supporting a location based service between a beacon device and a mobile device. The method 1100 may be performed at the server 160 of FIG. 1.

The method 1100 includes generating, at a server, an encoded beacon identifier (ID) based on a beacon device identifier of a beacon device and a time value, at 1102. For example, processor 162 (e.g., ID generator 170) of server 160 may generate the encoded beacon ID. In some implementations, referring to FIG. 1, processor 162 identifies a session key for use with the beacon device 110 and generates the encoded beacon ID based on the session key and using a pseudorandom function. The beacon device, such as the beacon device 110, may include a Bluetooth low energy device.

The method 1100 also includes generating, at the server, a mapping data structure that maps the encoded beacon ID to the beacon device identifier, at 1104. The mapping data structure associated with a time period. To illustrate, processor 162 (e.g., mapping generator 172) may generate the mapping data structure. For example, the mapping data structure may include or correspond to the mapping data structure 154, data structures 200, 240-270, or a combination thereof. In a particular implementation, the mapping data structure comprises a hash table. In some implementations, the method 1100 may include generating a plurality of mapping data structures. Each mapping data structure of the plurality of mapping data structures may be associated with a different time period and a different encoded beacon ID of the beacon device.

The method 1100 further includes sending, from the server to a mobile device, the mapping data structure, at 1106. For example, the mobile device may include or correspond to the mobile device 140. Referring to FIG. 1, the mapping data structure 154 is included in message 196 sent from server 160 to mobile device 140.

In some implementations, the method 1100 further includes receiving location data from a mobile device. For example, the location data may include or correspond to the location data 195. The location data indicates a physical location of the mobile device and the server may generate the mapping data structure based on the location data. In a particular implementation, the mapping data structure is generated based on at least one criterion and the location data. The at least one criterion, such as criterion 182, includes a distance, a communication range, a device type, a service type, or a combination thereof.

In some implementations, the method 1100 further includes receiving a second encoded beacon ID from the mobile device and identifying a second beacon identifier of a second beacon device based on a second mapping data structure which maps the second encoded beacon ID to the second beacon identifier. In such implementations, the method 1100 includes identifying, based on the second beacon identifier, an entry of a beacon device database. For example, the beacon device database may include or correspond to beacon device database 184, data structures 210, 270, or a combination thereof. The entry may include location data of the second beacon device. A location of the mobile device may be determined or updated based on the location data of the second beacon device.

In some implementations, the method 1100 includes generating filter parameter data based on one or more encoded beacon IDs included in the mapping data structure. For example, the filter parameters may include or correspond to the filter parameters 197. In such implementations, the method 1100 includes sending the filter parameter data to the mobile device. Referring to FIG. 1, the server 160 sends the filter parameters 197 included in message 196 (e.g., packet) to the mobile device 140.

In some implementations, the method 1100 includes receiving, from the mobile device, an encoded beacon ID look-up request that includes the encoded beacon ID. For example, the encoded beacon ID look-up request may include or correspond to the message 194 (e.g., packet) of FIG. 1. In such implementations, the method 1100 includes determining, based on the encoded beacon ID, the beacon ID of the beacon device, beacon data of the beacon device, or both, and transmitting, to the mobile device, the beacon ID, the beacon data, or both.

In some implementations, the method 1100 includes receiving, from a beacon device, beacon device data. The beacon device may include or correspond to the beacon device 110. The beacon device data may include the beacon device identifier, beacon device location data, a device type, or a combination thereof. The server may include the received beacon device data in the beacon device database 184 (e.g., the beacon device data 188).

In some implementations, the method 1100 includes generating a second encoded beacon ID based on the beacon device identifier and second time value and generating a second mapping data structure that maps the second encoded beacon ID to the beacon device identifier. The second mapping data structure is associated with a second time period that is distinct from the time period.

The method 1100 of FIG. 11 enables the server to operate in a system that provides a secure location based service along with a number of security mechanisms and protocols to defend against security threats, such as spoofing attacks, piggybacking attacks, and re-programming attacks. To illustrate, the server maintains data associated with the beacon device and the beacon ID to enable coordination between the different devices of the system, thus enabling the beacon device to update its beacon ID. Additionally, the server is configured to generate encoded beacon IDs (e.g., beacon IDs to be used in the future) as described above with reference to the beacon device. In such implementations, the server maintain a mapping data structure to map the encoded beacon ID(s) to the beacon data (e.g., the UUID, etc.) of the beacon device, thereby enabling coordination with the beacon device. The mapping data may also be provided to the mobile device to look up beacon IDs, which may advantageously reduce communication overhead between the mobile device and the server.

Figure 12:
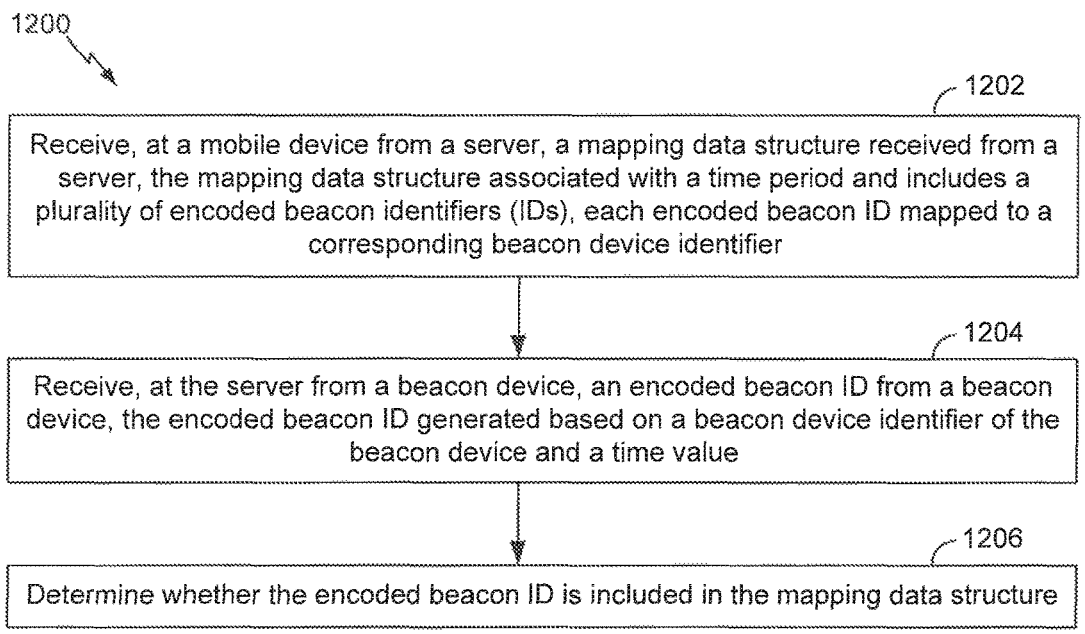
FIG. 12 is a flowchart of an illustrative method of operation of a mobile device.

Referring to FIG. 12, a method 1200 of operation at a mobile is shown. For example, the method 1200 may be related to a method for wireless communication, such as wireless communication associated with a location based service. The method 1200 may be performed at the mobile device 140 of FIG. 1.

The method 1200 includes receiving, at a mobile device from a server, a mapping data structure received from a server, the mapping data structure associated with a time period and includes a plurality of encoded beacon identifiers (IDs), at 1202. Each encoded beacon ID of the plurality of encoded beacon IDs is mapped to a corresponding beacon device identifier. For example, the server may include or correspond to the server 160, and the mapping data structure may include or correspond to the mapping data structure 154, data structures 200, 240-270, or a combination thereof. In a particular implementation, the mapping data structure comprises a hash table.

The method 1200 also includes receiving, at the mobile device from a beacon device, an encoded beacon ID, at 1204. The encoded beacon ID may be generated (by the beacon device) based on a beacon device identifier of the beacon device and a time value. For example, the beacon device, such as the beacon device 110 (e.g., a Bluetooth low energy device), may include or correspond to beacon device 110, and the encoded beacon ID may include or correspond to the beacon ID 191.

The method 1200 includes determining whether the encoded beacon ID is included in the mapping data structure, at 1206. For example, the mobile device may include a processor, such as processor 142, which is configured to determine whether beacon ID 191 is included (or identified) mapping data structure 154.

In some implementations, the method 1200 further includes, in response to a determination that the encoded beacon ID is not included in the mapping data structure, discarding the encoded beacon ID or initiating transmission of a look-up request that includes the encoded beacon ID to the server. Alternatively, the method 1200 includes, in response to a determination that the encoded beacon ID is included in the mapping data structure: identifying, based on the mapping data structure, a beacon device identifier that corresponds to the encoded beacon ID. In such implementations, the method 1200 may also include identifying, based on the beacon device identifier, a portion of the beacon data that corresponds to the beacon device.

In some implementations, the method 1200 further includes receiving filter parameter data from the server and storing the filter parameter data at a memory of the mobile device. The filter parameter data may include or correspond to the filter parameters 197. In such implementations, the method 1200 includes, in response to receiving the encoded beacon ID from the beacon device, filtering the encoded beacon ID based on the filter parameter data to determine whether the encoded beacon ID is valid. Determining whether the encoded beacon ID is included in the mapping data structure, at 1206, may be performed in response to a determination that the encoded beacon ID is valid.

In some implementations, the method 1200 further includes storing a beacon application at a memory of the mobile device. For example, referring to FIG. 1, the application may be stored at the memory 144 as at least part of the instructions 152. The beacon application may include or correspond to a location based service associated with the beacon device. The beacon application may include or otherwise indicate an address of the server. Additionally, or alternatively, the method 1200 may include determining location data associated with a location of the mobile device, and sending the location data to the server. For example, referring to FIG. 1, the location device 149 may determine the location data 195 that is sent to the server 160.

In some implementations, the method 1200 also includes sending the encoded beacon ID to the server. For example, the encoded beacon ID may be sent to the server in response to a determination that the encoded beacon ID is not included in the mapping data structure. In a particular implementation, the encoded beacon ID includes an indication of, or otherwise indicates, a location of the beacon device.

In some implementations, the method 1200 includes sending a delegation key request from the mobile device to the server and, responsive to the delegation key request, receiving a delegation key and first encrypted data from the server. For example, the delegation key may include or correspond to the delegation key dk sent at second time 512 in FIG. 5. In such implementations, the method 1200 includes sending a message that includes the first encrypted data associated with the delegation key request to the beacon device. The encrypted data may include or correspond to data sent at third time 514 in FIG. 5. The first encrypted data enables the beacon device to verify the message and generate the delegation key. The method 1200 may also include receiving second encrypted data from beacon device, and decrypting, at the mobile device, the second encrypted data using the delegation key.

In some implementations, the method 1200 includes: receiving, from the server, second filter parameter data and a second mapping data structure that includes a second plurality of encoded beacon identifiers (IDs). Each encoded beacon ID of the second plurality of encoded beacon IDs mapped to a corresponding beacon device identifier, and the second mapping data structure associated with a second time period that is distinct from the time period. In such implementations, the method 1200 also include, in response to receiving a second encoded beacon ID from a second beacon device, filtering the second encoded beacon ID based on the second filter parameter data to determine whether the second encoded beacon ID is valid, and in response to determination that the second encoded beacon ID is valid, determining whether the second encoded beacon ID is included in the mapping data structure.

The method 1200 of FIG. 12 enables the mobile device to operate in a system that provides a secure location based service along with a number of security mechanisms and protocols to defend against security threats, such as spoofing attacks, piggybacking attacks, and re-programming attacks. To illustrate, the mobile device is configured to establish a secure connection with the beacon device to ensure that the mobile device is authorized to communicate with the beacon device. Such authentication reduces a likelihood of the beacon device being subjected to a re-programming attack. Additionally, the mobile device may receive a mapping data structure form the server to enable the mobile device to look up beacon IDs, which may advantageously reduce communication overhead between the mobile device and the server.

Figure 13:
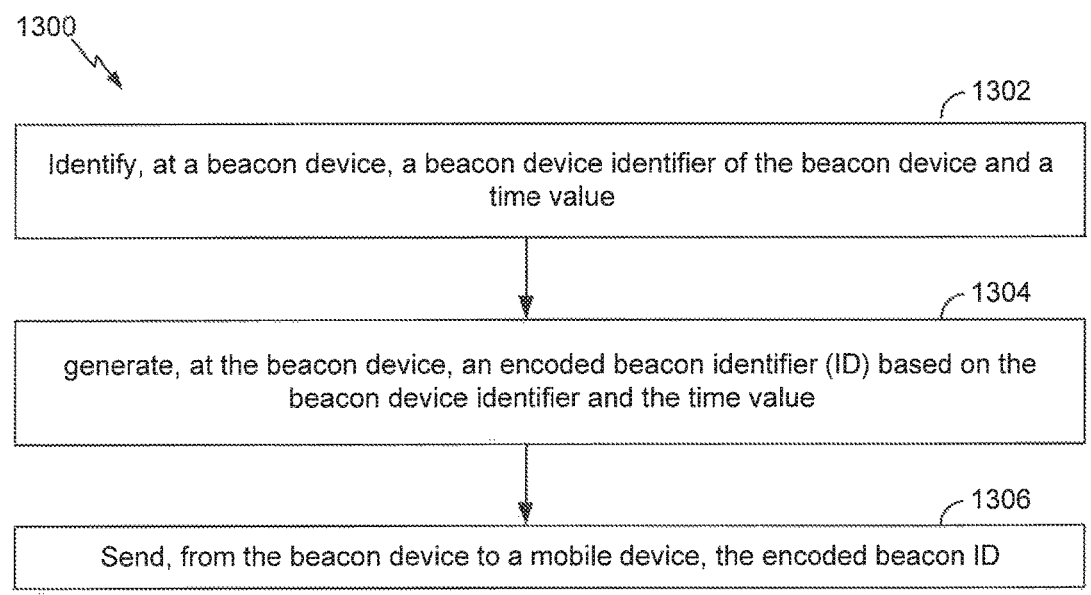
FIG. 13 is a flowchart of an illustrative method of operation of a beacon device.

Referring to FIG. 13, a method 1300 of operation at a server is shown. For example, the method 1300 may be related to a method for wireless communication, such as wireless communication associated with a location based service. The method 1200 may be performed at the beacon device 110, such as a Bluetooth low energy device, of FIG. 1.

The method 1300 includes identifying, at a beacon device, a beacon device identifier of the beacon device and a time value, at 1302. For example, the beacon device identifier may include or correspond to the device ID 136. The beacon device identifier may include a universally unique identifier (UUID), as an illustrative, non-limiting example. The time value may be determined based on or using a timer or clock, such as the clock 118 of FIG. 1. In some implementations, the method 1300 includes identifying particular time data, truncating the particular time data to determine the time value, and generating the encoded beacon ID by performing a pseudorandom function using the session key, the beacon device identifier, and the time value.

The method 1300 also includes generating, at the beacon device, an encoded beacon identifier (ID) based on the beacon device identifier and the time value, at 1304. For example, referring to FIG. 1, the processor 112 (e.g., the ID generator 126) may generate the encoded beacon ID (e.g., beacon ID 191) based on the device ID 136 and the time value.

The method 1300 includes sending, from the beacon device to a mobile device, the encoded beacon ID, at 1306. For example, referring to FIG. 1, beacon ID 191 is included in message 190 (e.g., a packet) that is transmitted (e.g., broadcast, multicast, or unicast) to mobile device 140. The message 190 (e.g., the beacon ID 191) may include a message authentication code (MAC).

In some implementations, the method 1300 also includes determining a second time value subsequent to the time value and generating a second encoded beacon identifier (ID) based on the beacon device identifier and the second time value. In such implementations, the method 1300 may include transmitting the second encoded beacon ID to the mobile device.

In some implementations, the method 1300 further includes initiating a session key update. In such implementations, the method 1300 includes generating, using a pseudorandom function, an updated session key based on the beacon device identifier and a random number, and encrypting, based on a master key known to the beacon device and a server, the random number to generate an encrypted random number. For example, referring to FIG. 6, beacon device 110 generates the updated session key and encrypts the random number at first time 610. The method 1300 may also include sending the beacon device identifier and the encrypted random number to the server and communicating with the server using updated session key. For example, referring to FIG. 1, the encrypted random number is in packet 192 as the key update 193.

In some implementations, the method 1300 includes establishing, using a RSA protocol, a secure channel with a server via the mobile device. The secure channel may include a secure sockets layer (SSL) channel or a transport layer security (TLS) channel, as illustrative, non-limiting examples. In such implementations, the method 1300 may include receiving, from the mobile device, a message and a signature from the server and a value calculated by the mobile device based on the signature and a public key. For example, referring to FIG. 8, the beacon device 110 receives the message m, the signature σ, and the value Y from the mobile device 140 at third time 814. The method 1300 may also include verifying the signature based on the value and the value and the public key, as described with reference to fourth time 816 of FIG. 8.

In some implementations, the method 1300 also includes identifying a first value for which an inverse is to be calculated and selecting a random value. For example, referring to FIG. 9 at first time 910, beacon device 110 identifies first value x and selects random number c. In such implementations, the method 1300 includes calculating a second value based on the first value and the random value and sending the second value to the mobile device for the mobile device to perform at least one exponential operation based on second value to generate a third value. Referring to FIG. 9, the beacon device 110 calculates second value d, sends the second value d at second time 912, and the mobile device 140 calculates third value e. The method 1300 further includes receiving the third value from the mobile device, verifying the third value, and in response to verification of the third value, calculating the inverse of the first value as a product of the first value and the third value. Referring to FIG. 9, beacon device 110 receives third value at fourth time 916 and calculates the inverse of the first value x as the product of c and e.

In some implementations, the method 1300 includes receiving, at the beacon device from the server, an input value and selecting a random value. For example, referring to FIG. 10, beacon device 110 receives input value x and selects random values of $u_i$, $v_i$, and b. In such implementations, the method 1300 includes calculating a second value based on the input value and the random value. Referring to FIG. 10 at first time 1010, the beacon device 110 calculates $z_b$, $z_{1-b}$, and d. The second value may correspond to an obfuscated version of a private key of the beacon device. The method 1300 may also include sending the second value to the mobile device for the mobile device to perform at least one exponential operation based on second value to generate a third value. Referring to FIG. 10 at third time 1014, the mobile device 140 calculates $w_0$, $zw_1$, and e. The method 1300 further includes receiving the third value from the mobile device and determining, based on the third value, a session key for use between the beacon device and the server. Referring to FIG. 10 at time 1018, the beacon device 110 performs verification and determines the session key y.

The method 1300 of FIG. 13 enables the beacon device 110 to operate in a system that provides a secure location based service along with a number of security mechanisms and protocols to defend against security threats, such as spoofing attacks, piggybacking attacks, and re-programming attacks. To illustrate, the beacon device is configured to update its beacon ID. By changing the beacon ID (and appearing to provide a random beacon ID), the system is able to defend against piggybacking attacks which rely on identification and continued use of a beacon ID to enable the attackers unauthorized use of the system. Additionally, the beacon device implements a pseudorandom function, or other encryption technique, to generate the beacon ID, a message or packet that includes the beacon ID, or both. By including the MAC in the beacon ID (or in a message or packet that includes the beacon ID), the beacon device is able to defend against spoofing attacks by enabling other devices (e.g., the mobile device or the server) to validate the beacon ID based on the MAC. Additionally, the beacon device is configured to establish a secure connection with another devices (e.g., the mobile device) to ensure that the other device is authorized to communicate with the beacon device. Such authentication reduces a likelihood of the beacon device being subjected to a re-programming attack. Successful mitigation of such attacks (e.g. spoofing attacks, piggybacking attacks, and re-programming attacks) improves operation and reliance of a location based services system, deters potential attacks which reduces overhead communication between devices, and improves efficiency and power usage of individual devices included in the system.

The process shown in any of the methods of FIGS. 3A-3C, 4, any of the ladder diagrams of FIGS. 5-10, or a combination thereof, may be controlled by a processing unit such as a central processing unit (CPU), a controller, a field-programmable gate array (FPGA) device, an application-specific integrated circuit (ASIC), another hardware device, firmware device, or any combination thereof. As an example, any of the methods of FIGS. 3A-3C, 4, any of the ladder diagrams of FIGS. 5-10, or a combination thereof, can be performed by one or more processors that execute instructions to determine an generate a beacon ID. Additionally, a first portion of one of the methods of FIGS. 3A-3C, 4 or one of the ladder diagrams of FIGS. 5-10 may be combined with at least a second portion of another one of the methods of FIGS. 3A-3C, 4 or one of the ladder diagrams of FIGS. 5-10. For example, a first portion of the method 1300 of FIG. 13 may be combined with a second portion of the ladder diagram of FIG. 6.

Although one or more of FIGS. 1-13 may illustrate systems, apparatuses, data structures, methods, or a combination thereof, according to the teachings of the disclosure, the disclosure is not limited to these illustrated systems, apparatuses, methods, or a combination thereof. One or more functions or components of any of FIGS. 1-13 as illustrated or described herein may be combined with one or more other portions of another function or component of FIGS. 1-13. Accordingly, no single implementation described herein should be construed as limiting and implementations of the disclosure may be suitably combined without departing from the teachings of the disclosure.

It should be appreciated that, although exemplary embodiments have been described with reference to wireless networks and/or wireless communications, the concepts herein are not limited to applicability to wireless implementations. Embodiments operable in accordance with the concepts herein may be implemented in any communication system, including wired communication systems, optical communication systems, etc., in which synchronization of network devices is desired.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Functional blocks and modules in FIGS. 1 and 5-10 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
    a memory configured to store a mapping data structure received from a server, the mapping data structure associated with a time period and includes a plurality of encoded beacon identifiers (IDs), each encoded beacon ID of the plurality of encoded beacon IDs mapped to a corresponding beacon device identifier,
    a receiver configured to receive an encoded beacon ID from a beacon device associated with a location based service, the encoded beacon ID generated based on a beacon device identifier of the beacon device and a time value; and
    a processor coupled to the memory and the receiver, the processor configured to:
        in response to a determination that the encoded beacon ID is included in the mapping data structure, identify, based on the mapping data structure, a beacon identifier that corresponds to the encoded beacon ID; and
        generate a beacon application identified based on the beacon identifier, the beacon amplification corresponds to the location based service.

2. The apparatus of claim 1, further comprising:
    a positioning system coupled to the processor and configured to generate location data associated with a physical position of the positioning system; and
    a transmitter configured to send the location data to the server,
    wherein the receiver is configured to receive the mapping data structure from the server, the mapping data structure generated based on the location data.

3. The apparatus of claim 1, wherein:
    the processor is further configured to, in response to a determination that the encoded beacon ID is not included in the mapping data structure, discard the encoded beacon ID or initiate transmission of a look-up request that includes the encoded beacon ID to the server.

4. The apparatus of claim 1, wherein:
    the memory is further configured to store beacon data associated with a plurality of beacon devices; and
    the processor is further configured to, in response to a determination that the encoded beacon ID is included in the mapping data structure:
        identify, based on the mapping data structure, a beacon device identifier that corresponds to the encoded beacon ID; and
        identify, based on the beacon device identifier, a portion of the beacon data that corresponds to the beacon device.

5. The apparatus of claim 1, wherein:
    the memory is further configured to store a second mapping data structure that includes a second plurality of encoded beacon identifiers (IDs), each encoded beacon ID of the second plurality of encoded beacon IDs mapped to a corresponding beacon device identifier, the second mapping data structure associated with a second time period that is distinct from the time period;
    the receiver is configured to receive a second encoded beacon ID from the beacon device; and
    the processor is further configured to determine whether the encoded beacon ID is included in the second mapping data structure.

6. The apparatus of claim 1, wherein the processor is further configured to access beacon application software based on the beacon identifier, and wherein the beacon application is generated based on execution of beacon application software by the processor.

7. The apparatus of claim 1, wherein the beacon device comprises a Bluetooth low energy device.

8. The apparatus of claim 1, wherein the beacon device identifier comprises a universally unique identifier (UUID).

9. The apparatus of claim 1, wherein:
    the processor is further configured to, in response to a determination that the encoded beacon ID is included in the mapping data structure, establish secure communication between the apparatus and the beacon device.

10. The apparatus of claim 1, wherein:
    the processor is further configured to, in response to a determination that the encoded beacon ID is included in the mapping data structure, enable secure communication between the server and the beacon device.

11. The apparatus of claim 1, wherein beacon application comprises a dedicated mobile location based service application.

12. A method for wireless communication, the method comprising:
    receiving, at a mobile device from a server, a mapping data structure received from a server, the mapping data structure associated with a time period and includes a plurality of encoded beacon identifiers (IDs), each encoded beacon ID mapped to a corresponding beacon device identifier, receiving, at the mobile device from a beacon device associated with a location based service, an encoded beacon ID from a beacon device, the encoded beacon ID generated based on a beacon device identifier of the beacon device and a time value;

determining whether the encoded beacon ID is included in the mapping data structure;

in response to a determination that the encoded beacon ID is included in the mapping data structure, identifying, based on the mapping data structure, a beacon identifier that corresponds to the encoded beacon ID; and generating, at the mobile device, a beacon application identified based on the beacon identifier, the beacon application corresponds to the location based service.

13. The method of claim 12, wherein the mapping data structure comprises a hash table.

14. The method of claim 12, further comprising:
storing a beacon application software at a memory of the mobile device;
determining location data associated with a location of the mobile device; and
sending the location data to the server, an address of the server indicated by the beacon application software.

15. The method of claim 12, further comprising sending the encoded beacon ID to the server, the encoded beacon ID including an indication of a location of the beacon device.

16. The method of claim 12, further comprising:
receiving filter parameter data from the server;
storing the filter parameter data at a memory of the mobile device; and
in response to receiving the encoded beacon ID from the beacon device, filtering the encoded beacon ID based on the filter parameter data to determine whether the encoded beacon ID is valid.

17. The method of claim 16, wherein determining whether the encoded beacon ID is included in the mapping data structure is performed in response to a determination that the encoded beacon ID is valid.

18. The method of claim 12, further comprising:
sending a delegation key request from the mobile device to the server;
responsive to the delegation key request, receiving a delegation key and first encrypted data from the server, sending a message that includes the first encrypted data associated with the delegation key request to the beacon device, wherein the first encrypted data enables the beacon device to verify the message and generate the delegation key;
receiving second encrypted data from beacon device; and
decrypting, at the mobile device, the second encrypted data using the delegation key.

19. The method of claim 12, further comprising:
receiving, from the server, second filter parameter data and a second mapping data structure that includes a second plurality of encoded beacon identifiers (IDs), each encoded beacon ID of the second plurality of encoded beacon IDs mapped to a corresponding beacon device identifier, the second mapping data structure associated with a second time period that is distinct from the time period;
in response to receiving a second encoded beacon ID from a second beacon device, filtering the second encoded beacon ID based on the second filter parameter data to determine whether the second encoded beacon ID is valid; and
in response to determination that the second encoded beacon ID is valid, determining whether the second encoded beacon ID is included in the mapping data structure.

20. A non-transitory computer readable medium comprising instructions that, when executed by a processor, cause the processor to:
receive, from a server, a mapping data structure received from a server, the mapping data structure associated with a time period and includes a plurality of encoded beacon identifiers (IDs), each encoded beacon ID mapped to a corresponding beacon device identifier;
receive, from a beacon device, an encoded beacon ID from a beacon device associated with a location based service, the encoded beacon ID generated based on a beacon device identifier of the beacon device and a time value;
determine whether the encoded beacon ID is included in the mapping data structure;
in response to a determination that the encoded beacon ID is included in the mains data structure, identify, based on the mapping data structure, a beacon identifier that corresponds to the encoded beacon ID; and
generate a beacon application identified based on the beacon identifier, the beacon application corresponds to the location based service.

* * * * *

UNITED STATES PATENT AND TRADEMARK OFFICE
CERTIFICATE OF CORRECTION

PATENT NO. : 10,219,106 B1  
APPLICATION NO. : 15/881295  
DATED : February 26, 2019  
INVENTOR(S) : Andy Lam et al.

Page 1 of 1

It is certified that error appears in the above-identified patent and that said Letters Patent is hereby corrected as shown below:

In the Specification

Column 16, Line 28, delete the first occurrence of "beacon data" and replace with --beacon_data--.
Column 21, Line 51, delete "signature a" and replace with --signature σ--.
Column 21, Line 53, delete "signature a" and replace with --signature σ--.
Column 22, Line 1, delete "signature a" and replace with --signature σ--.
Column 22, Line 3, delete "signature a" and replace with --signature σ--.

In the Claims

Column 31, Claim 1, Line 53, delete "identifier," and replace with --identifier;--.
Column 31, Claim 1, Line 66, delete "amplification" and replace with --application--.
Column 32, Claim 2, Line 6, delete "server," and replace with --server;--.
Column 33, Claim 12, Line 4, delete "identifier," and replace with --identifier;--.
Column 33, Claim 18, Line 47, delete "server," and replace with --server;--.
Column 34, Claim 20, Line 43, delete "mains" and replace with --mapping--.

Signed and Sealed this
Sixteenth Day of April, 2019

Andrei Iancu
*Director of the United States Patent and Trademark Office*